US012637062B2

(12) United States Patent
James et al.

(10) Patent No.: US 12,637,062 B2
(45) Date of Patent: May 26, 2026

(54) AUTONOMOUS PATH VARIATION TO DISTRIBUTE WEIGHT AND WEAR

(71) Applicant: Outrider Technologies, Inc., Brighton, CO (US)

(72) Inventors: Peter James, Golden, CO (US); Andrew Smith, Golden, CO (US); Lawrence Klein, Bend, OR (US); Jeremy Nett, Littleton, CO (US)

(73) Assignee: Outrider Technologies, Inc., Brighton, CO (US)

( * ) Notice: Subject to any disclaimer, the term of this patent is extended or adjusted under 35 U.S.C. 154(b) by 302 days.

(21) Appl. No.: 18/233,799

(22) Filed: Aug. 14, 2023

(65) Prior Publication Data

US 2024/0051521 A1 Feb. 15, 2024

Related U.S. Application Data

(60) Provisional application No. 63/398,114, filed on Aug. 15, 2022.

(51) Int. Cl.
| | |
|---|---|
| *B60W 30/06* | (2006.01) |
| *B60W 60/00* | (2020.01) |
| *G06V 20/58* | (2022.01) |

(52) U.S. Cl.
CPC .......... *B60W 30/06* (2013.01); *B60W 60/001* (2020.02); *G06V 20/586* (2022.01); *B60W 2300/14* (2013.01); *B60W 2420/403* (2013.01)

(58) Field of Classification Search
CPC .............. B60W 30/06; B60W 60/001; B60W 2300/14; B60W 2420/403; G06V 20/586
See application file for complete search history.

(56) References Cited

U.S. PATENT DOCUMENTS

| | | | |
|---|---|---|---|
| 2019/0187716 A1 | 6/2019 | Cantrell et al. | |
| 2020/0271749 A1* | 8/2020 | Wu ........................ | G01S 5/0278 |
| 2020/0401149 A1* | 12/2020 | Gong ..................... | G06Q 10/00 |
| 2021/0284198 A1* | 9/2021 | Schmidt ................ | B60W 30/09 |
| 2022/0180281 A1* | 6/2022 | Walton ........... | G06Q 10/063114 |

FOREIGN PATENT DOCUMENTS

WO WO-2022104276 A2 * 5/2022 ............. G01S 13/86

OTHER PUBLICATIONS

Written Opinion of the International Preliminary Examining Authority for PCT/US2023/030156 dated Jan. 22, 2025, 10 pages.
International Patent Application No. PCT/US2023/030153 International Search Report and Written Opinion dated Dec. 11, 2023, 10 pages.
Written Opinion of the International Preliminary Examining Authority for PCT/US2023/030156 dated Sep. 25, 2024, 10 pages.
International Patent Application No. PCT/US2023/030156 International Search Report and Written Opinion dated Dec. 11, 2023, 10 pages.

* cited by examiner

*Primary Examiner* — Xiao En Mo
(74) *Attorney, Agent, or Firm* — Cozen O'Connor

(57) ABSTRACT

A path for an autonomous tractor to move a trailer from a start spot to an ending spot has at least one path segment and a variation indicator that indicates a path variant for the autonomous tractor to follow for the path segment. The autonomous tractor follows the path variant to reduce wear caused by repetitive use of the same path by the autonomous tractor. The path variant may be selected as a least frequented path variant or may be selected as having carried the least amount of weight.

24 Claims, 17 Drawing Sheets

100

TRACTOR 104

LOCATION UNIT 216

CAMERA 218

BATTERY 202

DRIVE MOTOR 212

FIFTH WHEEL 222

LIDAR 220

DRIVE CIRCUIT 214

FW ACTUATOR 224

OPTICAL ENCODER 204

STEERING ACTUATOR 225

TRAILER AIR ACTUATOR 238

BRAKE ACTUATOR 239

CONTROLLER 206

PROCESSOR 208

MEMORY 210

FUNCTION STATE MACHINE 226

POINT CLOUD 221

MANEUVERING MODULE 240

TRAILER ANGLE MODULE 232

TRAILER ANGLE 233

NAVIGATION MODULE 234

IMAGE 219

STEERING ANGLE 250

ALIGNMENT MODULE 260

500

1400

1402
DETERMINE TRAILER MOVEMENT REQUIREMENT FROM STARTING SPOT TO ENDING SPOT

1404
DETERMINE PARKING POSITION FOR ENDING SPOT

1406
SEND PARKING POSITION TO THE AUTONOMOUS TRACTOR

1408
UPDATE USAGE OF PARKING POSITION FOR THE ENDING SPOT

1600

1602
DETERMINE TRAILER MOVEMENT REQUIREMENT
FROM STARTING SPOT TO ENDING SPOT

1604
DETERMINE STAGING POINT VARIATION FOR ENDING SPOT

1606
SEND STAGING POINT VARIATION TO THE
AUTONOMOUS TRACTOR

1608
UPDATE USAGE OF STAGING POINT VARIATION FOR THE ENDING SPOT

1

AUTONOMOUS PATH VARIATION TO DISTRIBUTE WEIGHT AND WEAR

CROSS-REFERENCE TO RELATED APPLICATION(S)

This application claims priority to, and benefits from, U.S. Provisional Patent Application Ser. No. 63/398,114, filed Aug. 15, 2022. The entire contents of the aforementioned application are incorporated herein by reference.

BACKGROUND

Trucks are an essential part of modern commerce. These trucks transport materials and finished goods across the continent within their large interior spaces. Such goods are loaded and unloaded at various facilities that can include manufacturers, ports, distributors, retailers, and end users. The start and end locations are referred to as "yards" and include areas that trailers are parked (and/or staged) and moved to and from for access by tractors (trucks) for loading to a dock door for loading/unloading cargo into the associated facility, leaving the yard for travel to its destination, or entering the yard from its destination. Autonomous yard vehicles technology includes tractors (trucks) that are capable of automatically (without human intervention, or with human intervention via teleoperation) coupling, decoupling, and maneuvering trailers that are within the yard.

Safety is of upmost importance in such automated yards. The automatic maneuvering of said trailers results in situations where, if a person or other obstacle is in the intended path of the trailer or tractor, because there is no human operating the tractor, there are situations where the tractor may not know of a human or obstacle. Thus, additional sensors are desired so that the controller of the automated tractor can maneuver the trailers safely.

Additional difficulties arise because various manufactures and freight companies have their own trailers. Thus, while an automated yard vehicle may have associated sensors, it is difficult to utilize sensors on the trailers themselves because it requires human (or machine) intervention on the trailer prior to maneuvering the trailer. This additional intervention step is timely and creates an additional location for safety concern.

SUMMARY

One aspect of the present embodiments includes the realization that autonomous tractors and trailers being moved are controlled through precise measurement of location and pose of the vehicle. However, repeated passage of an autonomous tractor over a common path results in more wear to the common path as compared to other areas of an autonomous yard. The autonomous tractor is instructed to follow a particular path to move a trailer from a first location to a second location within the autonomous yard. Although the start location and the end location of the path may vary for different parking spaces and loading bays, a significant portion of the travel is common to many if not all paths. Accordingly, the autonomous tractor traverses these common portions frequently, and without any significant variation in the tracks made by the tires of the autonomous tractor and the trailer. Accordingly, these tracks receive more weight and wear than other areas of the autonomous yard. The present embodiments solve this problem by varying the path the autonomous tractor is instructed to follow. Particularly, the path, or at least common portions of the path, are varied such that tires of the autonomous tractor and trailer for different trailer movements do not consistently fall into the same tracks. That is, a mission planner specifically defines a path for the autonomous tractor to follow that varies from other paths generated by the mission planner, thereby causing the autonomous tractor(s) to not always follow in the same tracks. Alternatively, mission control may not vary the path it generates, but a controller within the autonomous tractor may vary the path, by an offset amount selected at random for example, such that the same path is not always followed by the tractor. Advantageously, by varying the paths generated by the mission planner, tires of the autonomous tractor and trailer track over a wider area, reducing the weight applied to any one area, and thus reducing the wear to that area.

A further aspect of the present embodiments includes the realization that the autonomous tractor consistently positions trailer in a parking space (e.g., centering the trailer within the parking space), thereby causing damage to specific points of the parking space, such as wheel locations and landing gear locations. For example, where trailers are repeatedly positioned in substantially the same location (e.g., centered) within a parking spot, the weight of the trailer is always applied to the same wheel locations and landing gear locations. This pressure and wear causes damage to those areas, such as surface damage or compression, more for certain surfaces (e.g., tarmac, dirt, grass, shingle, etc.) than others. The present embodiments solve this problem by varying the position the trailer is deposited within the parking space.

DETAILED DESCRIPTION OF THE EMBODIMENTS

In an automated yard, an autonomous tractor moves trailers between staging areas and loading docks for unloading and/or loading. As used herein, the autonomous yard includes at least one autonomous vehicle, but may also include other vehicles (autonomous and/or non-autonomous), items (e.g., tractors, boxes, posts, curbs, etc.), or living beings. The autonomous tractor repeatedly couples (hitches) to a trailer, moves the trailer, and then decouples (unhitches) from the trailer.

Figure 1:
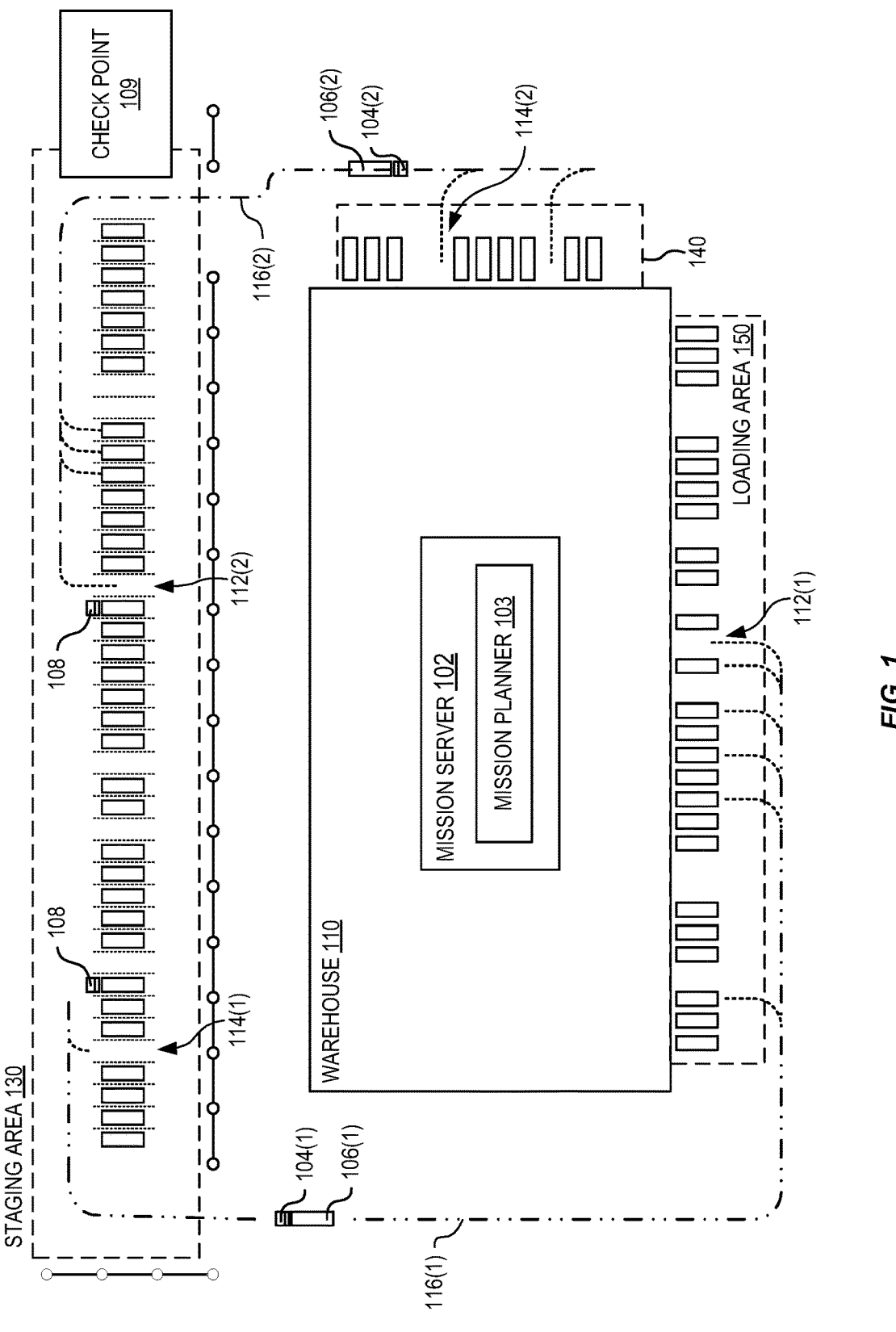
FIG. 1 is an aerial view showing one example autonomous yard that uses an autonomous tractor to move trailers between a staging area and loading docks of a warehouse, in embodiments.

FIG. 1 is an aerial view showing one example autonomous yard 100 (e.g., a goods handling facility, shipping facility, etc.) that uses an autonomous tractor 104 to move trailers 106 between a staging area 130 and loading docks of a warehouse 110. The autonomous tractor 104 may be an electric vehicle or may use a combustion-based engine such as a diesel tractor. For example, an over-the-road (OTR) tractors 108 deliver goods-laden trailers 106 from remote locations and retrieve trailers 106 for return to such locations (or elsewhere-such as a storage depot). In a standard operational procedure, OTR tractor 108 arrives with trailer 106 and checks-in at a facility entrance checkpoint 109. A guard/attendant enters information (e.g., trailer number or QR (ID) code scan-embedded information already in the system, which would typically include: trailer make/model/ year/service connection location, etc.) into a mission server 102 (e.g., a computer software server that may be located offsite, in the cloud, fully onsite, or partially located within a facility building complex, shown as a warehouse 110). Warehouse 110 includes perimeter loading docks (located on one or more sides of the building), associated (typically elevated) cargo portals and doors, and floor storage, all arranged in a manner familiar to those of skill in shipping, logistics, and the like.

By way of a simplified operational example, after arrival of OTR tractor 108 and trailer 106, the guard/attendant at checkpoint 109 directs the driver to deliver trailer 106 to a specific numbered parking space in a designated staging area 130, which may include a large array of side-by-side trailer parking locations, arranged as appropriate for the facility's overall layout.

Once the driver has parked the trailer in the designated parking space of the staging area 130, he/she disconnects the service lines and ensures that connectors are in an accessible position (i.e., if adjustable/sealable), and decouples OTR tractor 108 from trailer 106. If trailer 106 is equipped with swing doors, this can also provide an opportunity for the driver to unlatch and clip trailer doors in the open position, if directed by yard personnel to do so.

At some later time, (e.g., when warehouse is ready to process the loaded trailer) mission server 102 directs (e.g., commands or otherwise controls) tractor 104 to automatically couple (e.g., hitch) with trailer 106 at a pick-up spot in staging area 130 and move trailer 106 to a drop-off spot at an assigned unloading dock in unloading area 140 for example. Accordingly, tractor 104 couples with trailer 106 at the pick-up spot, moves trailer 106 to unloading area 140, and then backs trailer 106 into the assigned loading dock at the drop-off spot such that the rear of trailer 106 is positioned in close proximity with the portal and cargo doors of warehouse 110. The pick-up spot and drop-off spot may be any designated trailer parking location in staging area 130, any loading dock in unloading area 140, and any loading dock within loading area 150.

Manual and/or automated techniques are used to offload the cargo from trailer 106 and into warehouse 110. During unloading, tractor 104 may remain hitched to trailer 106 or may decouple (e.g., unhitch) to perform other tasks. After unloading, mission server 102 directs tractor 104 to move trailer 106 from a pick-up spot in unloading area 140 and to a drop-off spot, either returning trailer 106 to staging area 130 or delivering trailer 106 to an assigned loading dock in a loading area 150 of warehouse 110, where trailer 106 is then loaded. Once loaded, mission server 102 directs tractor 104 to move trailer 106 from a pick-up spot in loading area 150 to a drop-off spot in staging area 130 where it may await collection by another (or the same) OTR tractor 108. Given the pick-up spot and the drop-off spot, tractor 104 may autonomously move trailer 106.

In the example of FIG. 1, first autonomous tractor 104(1) moves trailer 106(1) from starting spot 112(1) (e.g., a loading dock within loading area 150) to ending spot 114(1) (e.g., a parking spot within staging area 130) using a first common path 116(1) (illustrated in a first dashed style). Particularly, common path 116(1) is used when moving all trailers 106 from loading area 150 to staging area 130, and because autonomous tractor 104 is operated to follow path 116(1) as closely as possible, tires of autonomous tractor 104 and trailers 106 following path 116(1) tend to follow the same tracks, causing the weight of tractor 104 and trailers 106 to be applied to those tracks, potentially causing damage. Similarly, tractor 104(2) is shown moving trailer 106(2) from starting spot 112(2) to ending spot 114(2) using common path 116(2). Common path 116(2) is thus used when moving all trailers from staging area 130 to unloading area 140, causing wear and/or damage to common path 116(2).

Figure 2:
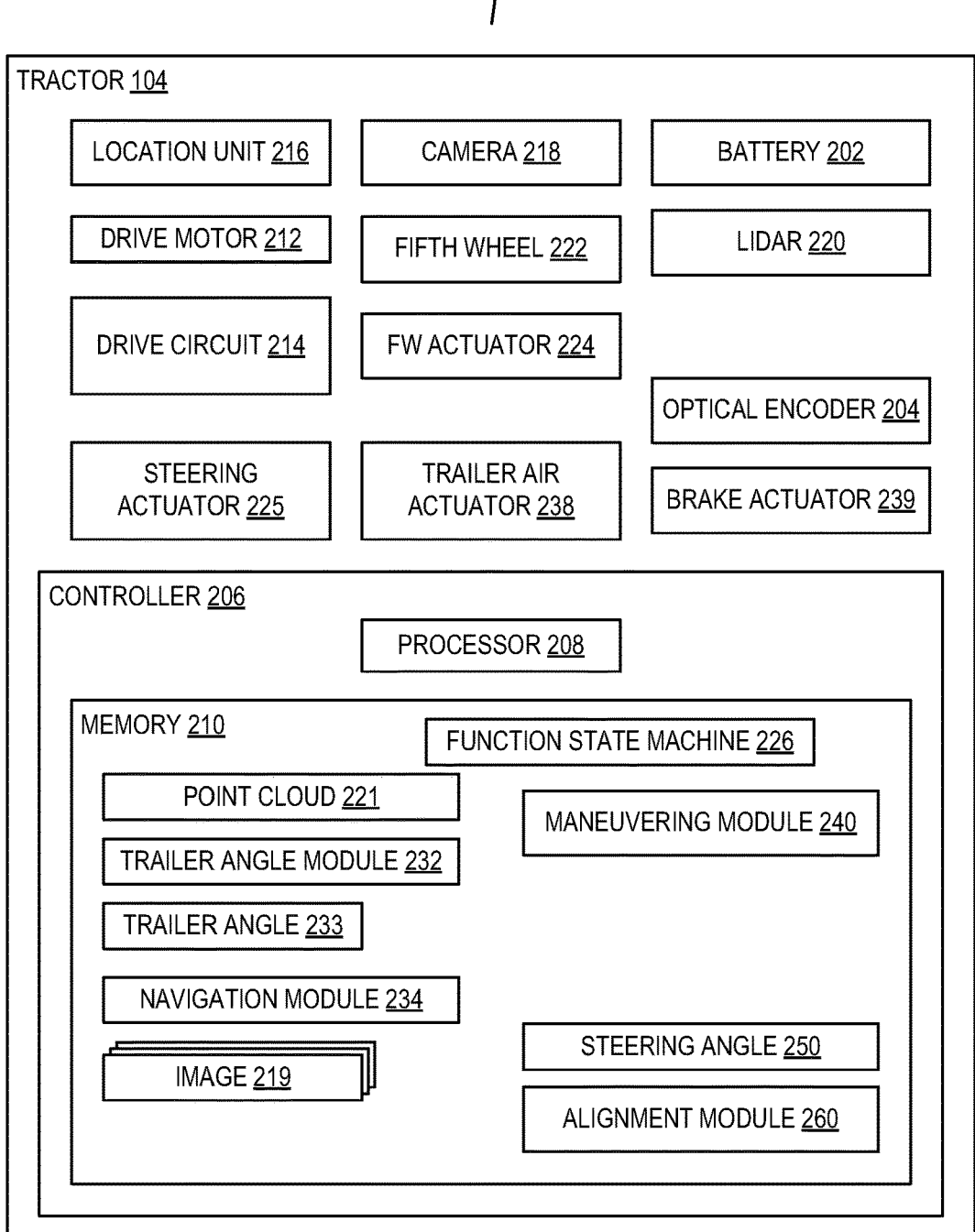
FIG. 2 is a block diagram illustrating key functional components of the tractor of FIG. 1, in embodiments.

FIG. 2 is a block diagram illustrating functional components of tractor 104 of FIG. 1. Tractor 104 includes a battery 202 for powering components of tractor 104 and a controller 206 with at least one digital processor 208 communicatively coupled with memory 210 that may include one or both of volatile memory (e.g., RAM, SRAM, etc.) and non-volatile memory (e.g., PROM, FLASH, Magnetic, Optical, etc.). Memory 210 stores a plurality of software modules including machine-readable instructions that, when executed by the at least one processor 208, cause the at least one processor 208 to implement functionality of tractor 104 as described herein to operate autonomously within autonomous yard 100 under direction from mission server 102.

Tractor 104 also includes at least one drive motor 212 controlled by a drive circuit 214 to mechanically drive a plurality of wheels (not shown) to maneuver tractor 104.

Tractor 104 also includes a location unit 216 (e.g., a GPS receiver, wireless-signal triangulator, inertial measurement unit (IMU), or other device capable of determining location of the tractor 104) that determines a location and orientation of tractor 104, a plurality of cameras 218 for capturing images 219 of objects around tractor 104, and at least one Light Detection and Ranging (LIDAR) device 220 (hereinafter LIDAR 220) for determining a point cloud about tractor 104. Location unit 216, the plurality of cameras 218, and the at least one LIDAR 220 cooperate with controller 206 to enable autonomous maneuverability and safety of tractor 104. Tractor 104 includes a fifth wheel (FW) 222 for coupling with trailer 106 and a FW actuator 224 controlled by controller 206 to position FW 222 at a desired height. In certain embodiments, FW actuator 224 includes an electric motor coupled with a hydraulic pump that drives a hydraulic piston that moves FW 222. However, FW actuator 224 may include other devices for positioning FW 222 without departing from the scope hereof. Tractor 104 may also include an air actuator 238 that controls air supplied to trailer 106 and a brake actuator 239 that controls brakes of tractor 104 and trailer 106 when connected thereto via air actuator 238.

Controller 206 also includes a trailer angle module 232 that determines a trailer angle 233 between tractor 104 and trailer 106 based on one or both of a trailer angle measured by an optical encoder 204 positioned near FW 222 and mechanically coupled with trailer 106 and a point cloud 221 captured by the at least one LIDAR 220.

Tractor 104 also includes an alignment module 260 that provides improved localized alignment of tractor 104 such as when at a loading/unloading dock in unloading area 140 and loading area 150.

Controller 206 may implement a function state machine 226 that controls operation of tractor 104 based upon commands (requests) received from mission server 102. For example, mission server 102 may receive a request (e.g., from a mission controller cloud service, via an API, and/or via a GUI used by a dispatch operator) to move trailer 106 from a first location (e.g., slot X in staging area 130) to a second location (e.g., loading dock Y in unloading area 140). In response to the request (and/or once this request is validated), mission server 102 invokes a mission planner 103 (e.g., a software package) that computes a 'mission plan' (e.g., see mission plan 320, FIG. 3) for each tractor 104. For example, the mission plan is an ordered sequence of high-level primitives to be followed by tractor 104, in order to move trailer 106 from location X to location Y. The mission plan may include primitives such as drive along a first route, couple with trailer 106 in parking location X, drive along a second route, back trailer 106 into a loading dock, and decouple from trailer 106.

Function state machine 226 includes a plurality of states, each associated with at least one software routine (e.g., machine-readable instructions) that is executed by processor 208 to implements a particular function of tractor 104. Function state machine 226 may transition through one or more states when following the primitives from mission server 102 to complete the mission plan.

Controller 206 may also include an articulated maneuvering module 240, implemented as machine-readable instructions that, when executed by processor 208, cause processor 208 to controls drive circuit 214 and steering actuator 225 to maneuver tractor 104 based on directives from mission server 102.

Controller 206 may also include a navigation module 234 that uses location unit 216 to determine a current location and orientation of tractor 104. Navigation module 234 may also use other sensors (e.g., camera 218 and/or LIDAR 220)

to determine the current location and orientation of tractor 104 using dead-reckoning techniques.

Although shown local to autonomous tractor 104, it should be appreciated that the maneuvering module 240, and associated functionality, may be remote from the tractor 104, such as at a remote teleoperations server, or other external server to the autonomous tractor 104. In such remote configurations, the necessary data needed by maneuvering module 240 from tractor 104 may be wirelessly transmitted from the tractor 104 to the remote server. Similarly, the necessary data needed by the tractor 104 to autonomously operate, such as mission plan 320 may then be transmitted from the remote server to the tractor 104.

Articulated Backing

Figure 3:
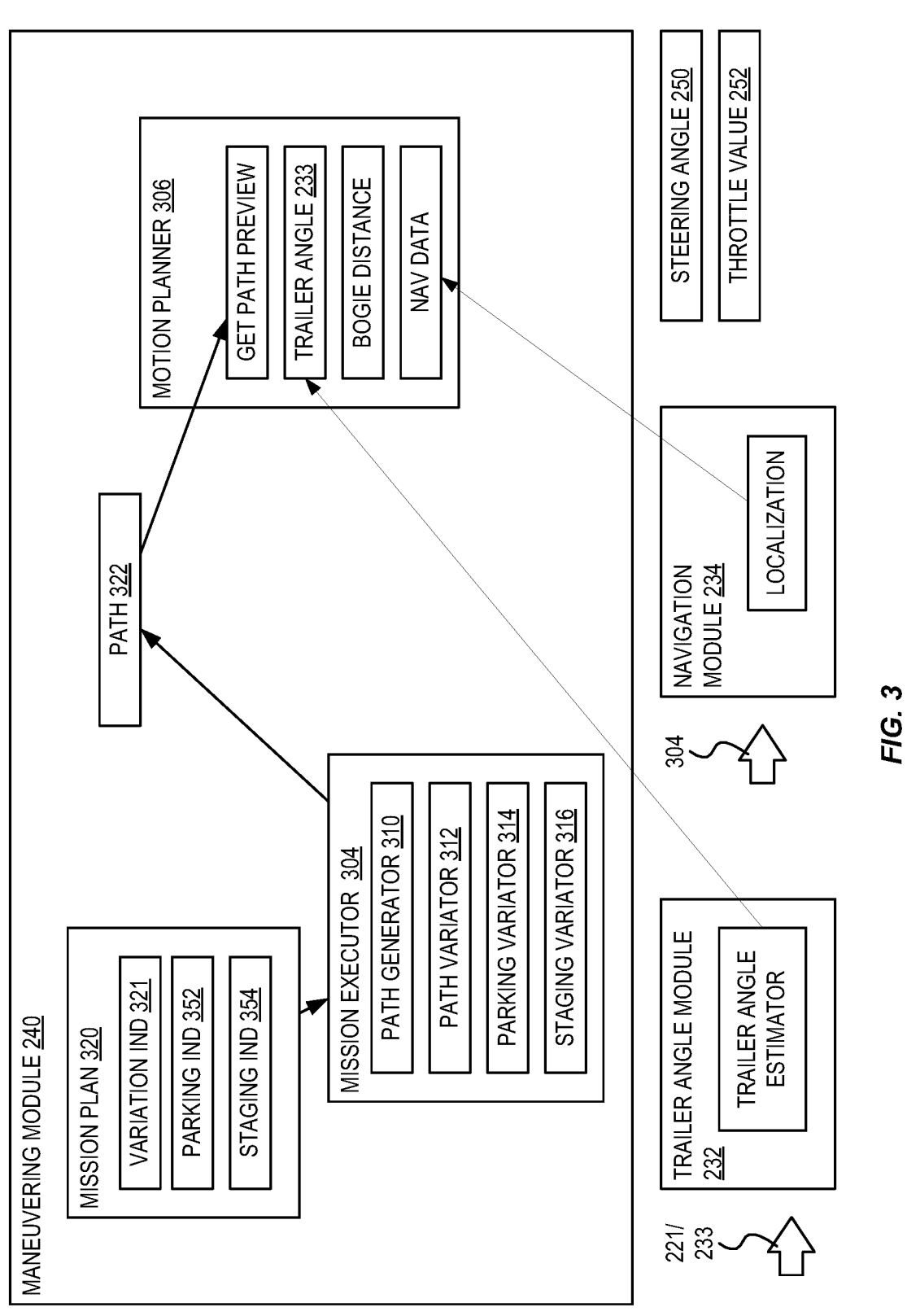
FIG. 3 shows the maneuvering module of FIG. 2, in further example detail.

FIG. 3 shows maneuvering module 240 of controller 206, FIG. 2, in further example detail. Maneuvering module 240 includes a mission executor 304 and a motion planner 306. Mission executor 304 may receive, from mission planner 103 running in mission server 102, a mission plan 320 that defines an ordered list of mission segments, where each mission segment is a high-level primitive defining at least one activity to be performed by tractor 104. Mission executor 304 executes mission plan 320 by coordinating operation of one or more components of tractor 104. For example, a path generator 310 of mission executor 304 may define at least one path 322 that motion planner 306 controls tractor 104 to follow. For example, motion planner 306 may control steering angle 250 and throttle value 252 and use one or more inputs including trailer angle 233, and navigation data (e.g., a current location and orientation) from navigation module 234, and so on, to control tractor 104 to follow path 322. Accordingly, motion planner 306 causes tractor 104 to execute maneuvers and accomplish mission goals defined by mission plan 320. Examples of mission goals include achieving a given pose (e.g., location and orientation), follow a waypoint plan, and so on. These mission goals may be defined by mission plan 320 or may be generated, based on mission plan 320, by mission executor 304. In certain embodiments, described in further detail below, mission plan 320 may include a variation indicator 321 that causes mission executor 304 to invoke a path variator 312 to vary path 322, thereby distributing weight and reducing wear caused by tractor 104 and trailer 106 within autonomous yard 100. Mission executor 304 may also include a parking variator 314 that is invoked to vary the position of trailer 106 when parking trailer 106 to prevent excessive damage and/or wear to the parking spot. Path variator 312 and parking variator 314 are described in further detail below.

Figure 4:
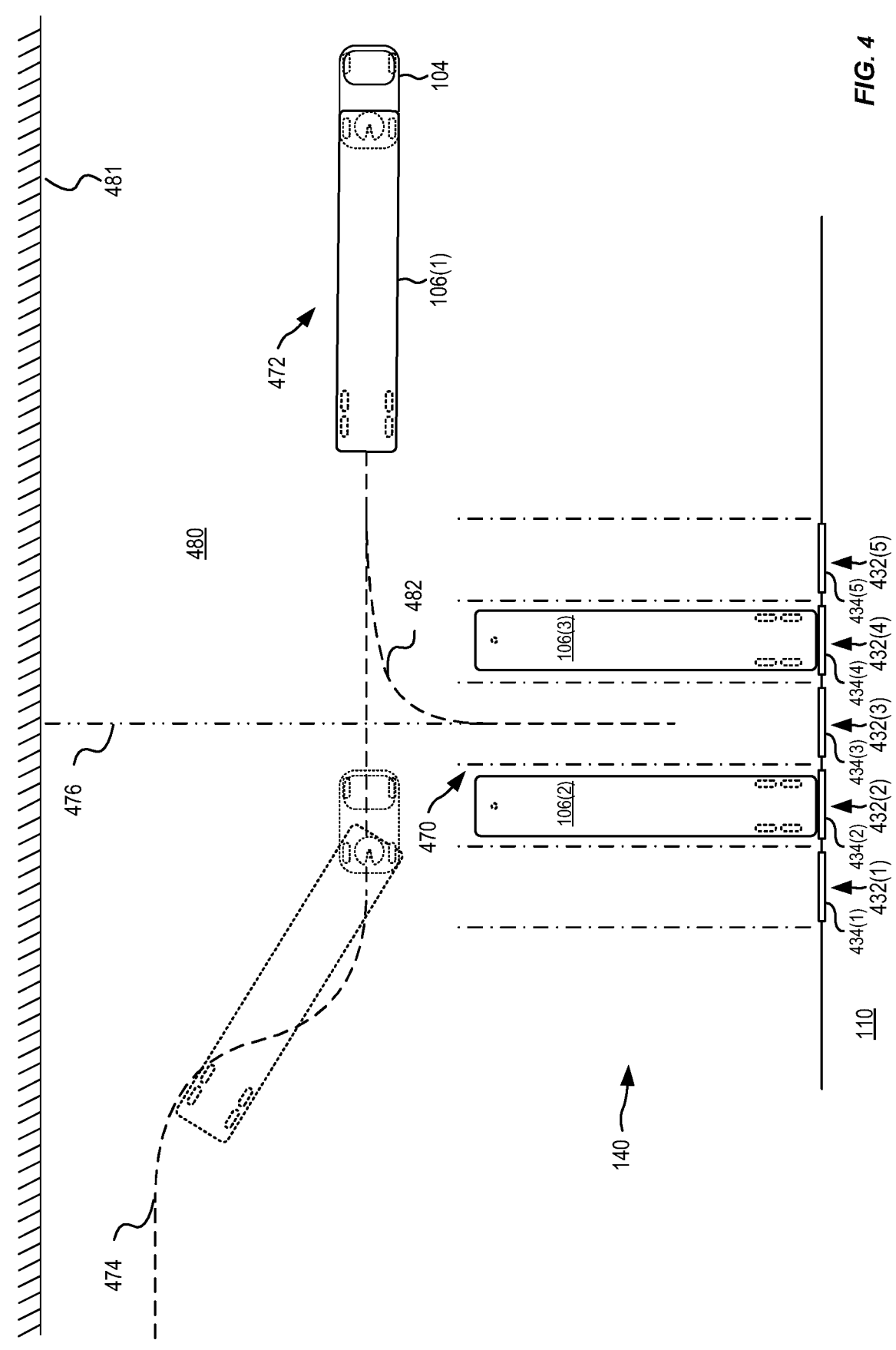
FIG. 4 is a schematic plan view illustrating one example mission for the tractor of FIG. 1 to deposit the trailer in a drop-off spot within the unloading area of the autonomous yard, in embodiments.

FIG. 4 is a schematic plan view illustrating one example mission for tractor 104 to deposit trailer 106 in a drop-off spot 470 (e.g., a loading dock 432) within unloading area 140 of autonomous yard 100 of FIG. 1. Tractor 104 positions trailer 106 in preparation for backing trailer 106 into a drop-off spot 470, which in this example is one of a plurality of loading docks 432 of unloading area 140 of warehouse 110. Each loading dock 432 has a loading door 434, with which the parked trailers align. In the Example of FIG. 4, no trailer is parked at drop-off spot 470, which corresponds to loading dock 432(3); however, loading docks 432(2) and 432(4), which are adjacent to loading dock 432(3), each have a parked trailer. Since trailer doors are at the rear of trailer 106, trailer 106 is reversed up to loading dock 432 and is correctly aligned with loading door 434 to provide full and safe access to trailer 106. A reference path 476, centered on drop-off spot 470 (e.g., loading dock 432(3)) may be determined by controller 206 to facilitate alignment of trailer 106 when backing into drop-off spot 470. Controller 206 may determine a staging path 474 for tractor 104 to follow to approach drop-off spot 470. Staging path 474 is determined based upon a starting orientation and location of tractor 104 and trailer 106 relative to drop-off spot 470 and is selected to position both tractor 104 and trailer 106 at the desired staging point 472, with the desired orientation.

Trailer Backing Method

Figure 5A:
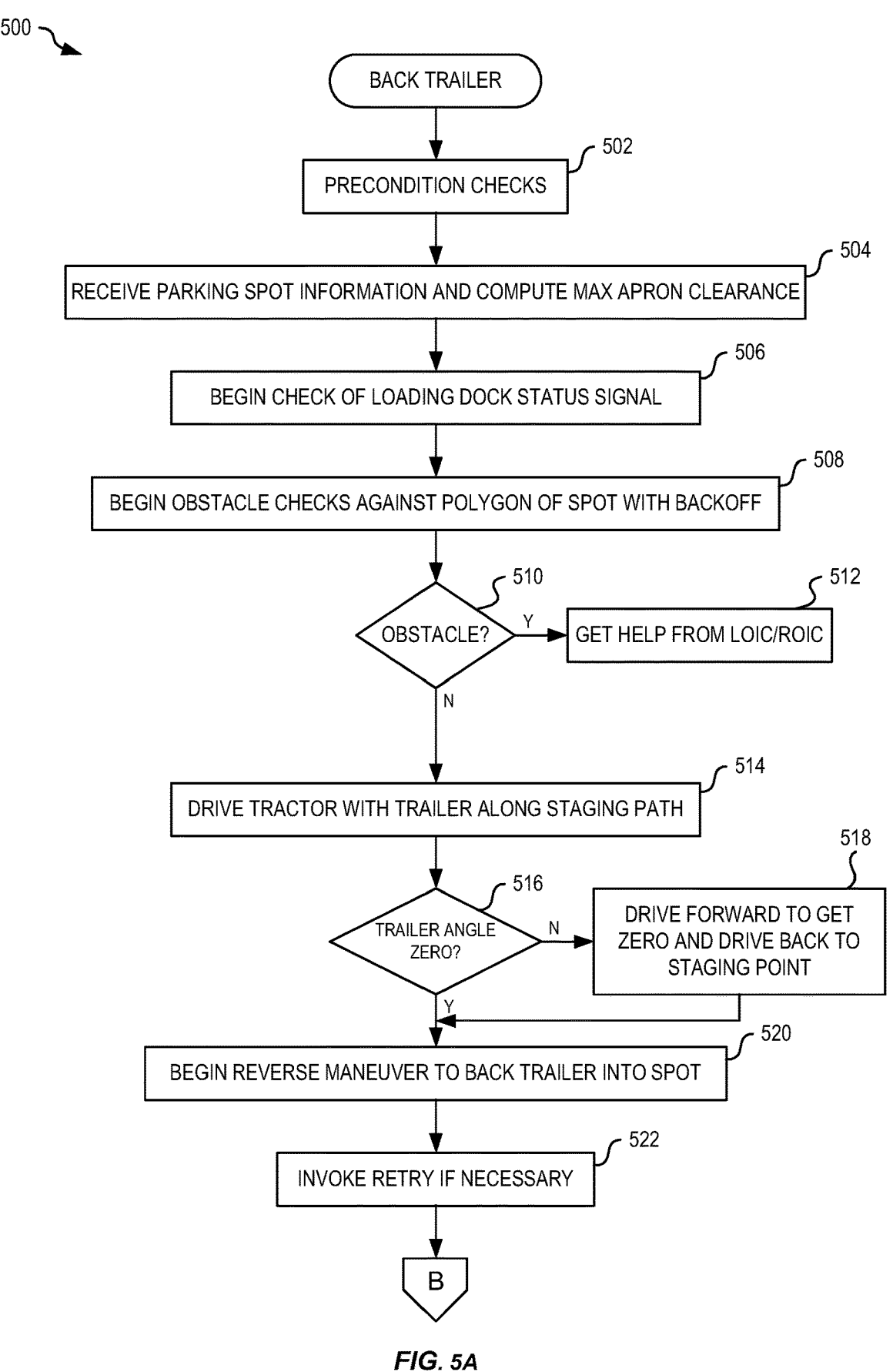
FIGS. 5A and 5B are flowcharts illustrating one example method for backing the trailer into the drop-off spot of FIG. 4, in embodiments.
Figure 5B:
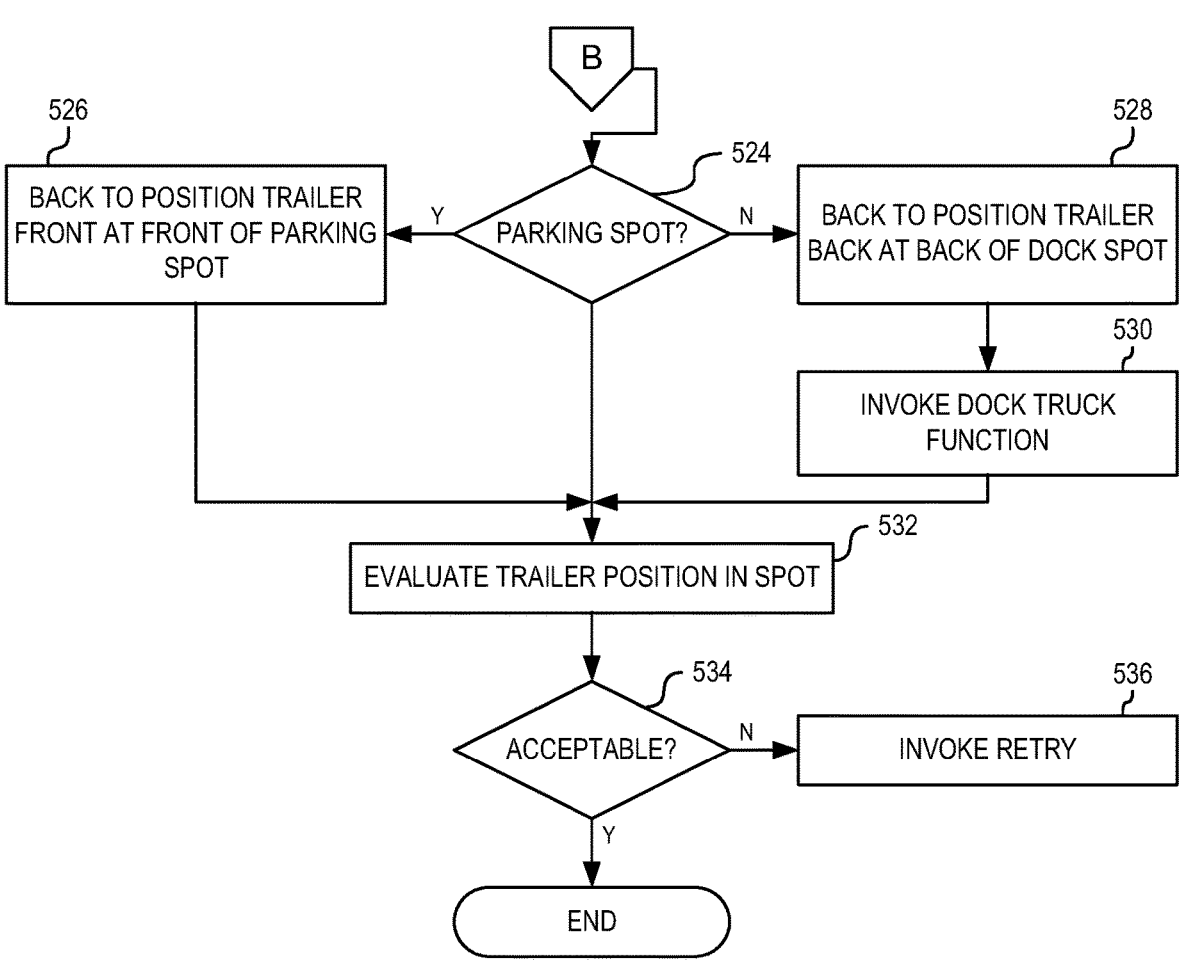

FIGS. 5A and 5B are flowcharts illustrating one example method 500 for backing trailer 106 into drop-off spot 470 of FIG. 4. The following example continues the mission, received from mission server 102, to move trailer 106 from (e.g., starting spot 112(1)) to drop-off spot 470. Method 500 is, for example, implemented at least in part by controller 206 of tractor 104 to cause tractor 104 to autonomously back trailer 106 into drop-off spot 470. In block 502, method 500 performs precondition checks. In one example of block 502, controller 206 checks that trailer 106 is attached to tractor 104 by verifying that FW 222 is locked and kingpin 308 is sensed within FW 222. In block 504, method 500 received drop-off spot information and computes maximum apron clearance. In one example of block 504, controller 206 uses location information of drop-off spot 470, received from mission server 102, to compute freespace 480 near drop-off spot 470 by projecting lines radially from a front location of drop-off spot 470 to intersect with a line of any polygon defining structure (e.g., another trailer parking spot, a no-go area, an area boundary, a building, a wall 481, etc.) of autonomous yard 100.

Block 506 is only executed when drop-off spot 470 is a loading dock. In block 506, method 500 begins checking the loading dock status signal. In one example of block 506, controller 206 receives the loading dock status signal indicative of loading dock 432(3) at drop-off spot 470 being ready to receive trailer 106.

In block 508, method 500 begins obstacle checks against a polygon of drop-off spot with backoff. Any object detected within drop-off spot 470 may prevent trailer 106 from entering or being parked at drop-off spot 470. In one example of block 508, controller 206 uses LIDAR 220 to capture point cloud 221 of drop-off spot 470 and processes point cloud 221 to detect objects within drop-off spot 470, allowing for backoff of a small distance that ensures that trailer bumpers at a loading dock and a parking curb within staging area 130 are not detected as objects preventing parking of trailer 106. In certain embodiments, controller 206 may also use other sensors (e.g., cameras and RADAR) to capture data of drop-off spot 470 that may also, or alternatively, be used to detect objects within drop-off spot 470 that may prevent parking of trailer 106 therein.

Block 510 is a decision. If, in block 510, method 500 determines that an obstacle is present, method continues with block 512; otherwise, method 500 continues with block 514. In block 512, method 500 gets help from a remote operator or remote device.

In block 514, method 500 drives the tractor and the trailer forwards along a staging path. In one example of block 514, controller 206 controls tractor 104 to pull trailer 106 along staging path 474 that positions tractor 104 and trailer 106 for reversing into drop-off spot 470. Block 516 is a decision. If, in block 516, method 500 determines that the trailer angle is not within a predefines tolerance of zero, method 500 continues with block 518; otherwise, method 500 continues with block 520. In one example of block 516, while tractor 104 is stopped at staging point 472, controller 206 determines, based on trailer angle 233 being approximately zero, whether trailer 106 is aligned with tractor 104. In block 518, when the trailer angle is not close enough to zero and to correct the trailer angle, method 500 moves (e.g., called a "push-out" maneuver) tractor 104 forward in a straight line for a predefined distance, and then reverses tractor 104 and trailer 106 straight backwards to staging point 472. Staging path 474 is designed with a built-in push-out, but in certain circumstances, the built-in push-out is insufficient to straighten trailer 106. When backing trailer 106, it is advantageous to start the backing with a substantially zero trailer angle.

In block 520, method 500 begins the reversing maneuver to back the trailer into the drop-off spot. In one example of block 520, controller 206 controls tractor 104 to back trailer 106 along backing path 482 into drop-off spot 470. For example, controller 206 may control steering actuator 225 of tractor 104 to maneuver tractor 104 into freespace 480 as needed to reverse the back end of trailer 106 along backing path 482 and into drop-off spot 470 without trailer 106 or tractor 104 encroaching on other parking spaces or structures of autonomous yard 100. In block 522, method 500 invokes a retry if necessary. In one example of block 522, controller 206 detects that the current location of trailer 106 relative to backing path 482 exceeds a predefined tolerance and invokes a retry of the backing maneuver, whereby controller 206 controls tractor 104 to pull forward, along reference path 476 for example, to align with drop-off spot 470, and then reverses trailer 106 into drop-off spot 470, along reference path 476 for example.

Block 524 is a decision. If, in block 524, method 500 determines that the drop-off spot is a parking spot, method 500 continues with block 526; otherwise, method 500 continues with block 528. In block 526, method 500 backs to position the trailer front end at a front of the parking spot. In one example of block 526, controller 206 positions a front end of trailer 106 at a front of drop-off spot 470. For example, this positions the front of each trailer at the front of the parking spot irrespective of trailer length. Geometry of each parking spot is defined when autonomous yard 100 is commissioned, whereby each parking spot may be sized to accommodate all trailer lengths used within autonomous yard 100. Method 500 continues with block 532.

In block 528, method 500 backs to position the trailer back at the back of the drop-off spot. In one example of block 528, controller 206 backs trailer 106 into drop-off spot 470 such that the back end of trailer 106 is at the back end of drop-off spot 470. Since drop-off spot 470 is a loading dock (e.g., loading dock 432(3)), it is important that the back end of trailer 106 be immediately in front of loading door 434(3). In block 530, method 500 invokes a dock tractor function. In one example of block 530, controller 206 invokes a dock function that uses drive circuit 214 to applies throttle to push trailer 106 against bumpers of loading dock 432(3) to minimize rebound, and brakes of trailer are applied such that trailer 106 remains positioned directly in front of loading dock 432(3).

In block 532, method 500 evaluates whether the trailer is positioned within the drop-off spot acceptably. In one example of block 532, controller 206 uses one or more of location unit 216, trailer angle 233, known dimensions of trailer 106, camera 218, and LIDAR 220 to evaluate the position of trailer 106 within drop-off spot 470. Where drop-off spot 470 is a parking spot, controller 206 determines that trailer 106 is contained within the polygon defined for the parking spot. Where drop-off spot 470 is a loading dock, controller 206 evaluates whether an estimated position of the back end of trailer 106 is within a desired lateral accuracy of a center (e.g., a reference path 476) of loading dock 432(3).

Block 534 is a decision. If, in block 534, method 500 determines that the position of trailer is acceptable, method 500 terminates; otherwise, method 500 continues with block 536. In block 536, method 500 invokes a retry. In one example of block 536, controller 206 controls tractor 104 to pull trailer 106 straight ahead (e.g., along reference path 476) for a distance determined by freespace 480 (e.g., from apron clearance). At the end of this path, controller 206 control tractor 104 to back trailer 106 along reference path 476 into drop-off spot 470, repeating blocks 520 through 534 up to a maximum number of retries.

Figure 6:
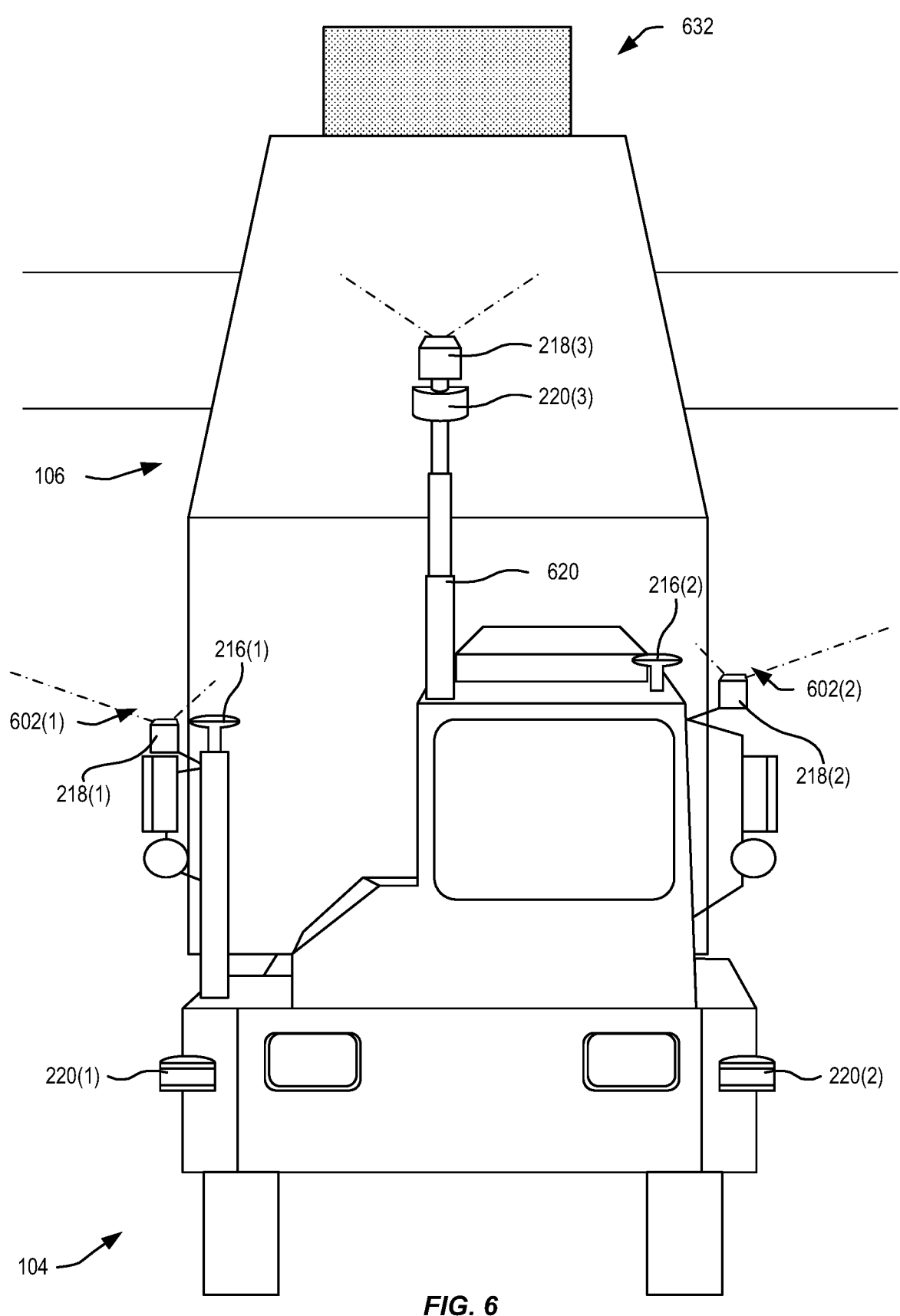
FIG. 6 is a schematic showing one example autonomous tractor reversing a trailer up to a loading dock, in embodiments.

FIG. 6 is a schematic showing one example autonomous tractor 104 reversing a trailer 106 up to a loading dock 632. In this example, tractor 104 uses multiple rear facing cameras 218 and/or LIDAR devices 220 to assist with maneuvering, however, trailer 106 obscures any view tractor 104 has of an area immediately behind trailer 106. Although, as described above, many different safety procedures (e.g., drive by) may be implemented, when reversing, any object that moves into the area behind trailer 106 is not detected by tractor 104.

As shown in FIG. 6, tractor 104 has two rear-facing cameras 218(1)-(2), one positioned at each side of tractor 104, near wing mirrors for example, such that each has a rearward field of view 602 that includes a corresponding side of trailer 106. As tractor 104 is reversing trailer 106 into loading dock 432(3), controller 206 evaluates images 219 captured by cameras 218, identifies any fiducial markings and/or structure of loading dock 432(3) captured in the images, and computes a relative navigation solution for tractor 104 relative to the identified fiducial markings and/or structure and their position within the images.

In certain embodiments, another camera 218(3) may be fitted to an extendable mast 620 coupled with tractor 104. As trailer 106 approaches loading dock 432, mast 620 may be extended to provide camera 218(3) with a higher vantage point that provides camera 218(3) with a view over trailer 106. Particularly, camera 218(3), positioned on extendable mast 620, has an unobstructed view of any fiducial marker and/or structure of loading dock 432(3), and images 219 captured, at intervals or substantially continuously, by camera 218(3) may be used to provide a local frame of reference for tractor 104 that allows alignment module 260 to estimate a location and orientation of tractor 104 more accurately. Alignment module 260 processes images from cameras 218, identifies fiducial markings and/or structure, and computes, based upon position and orientation of cameras 218 relative to tractor 104 and known locations of the fiducial markings and/or structure, improved position and orientation of tractor 104. Accordingly, the position of trailer 106(1), which is determined based upon its length and angle relative to tractor 104, is also determined more accurately. Alignment module 260 may also use position and orientation determined by location unit 216 when determining the localized position of tractor 104. Alignment module 260 may be invoked at intervals to maintain the localized position and orientation of tractor 104 relative to loading dock 432 over time to mitigate drift errors.

In certain embodiments, alignment module 260 processes images (e.g., image 219) captured by cameras 218(1) and 218(2) as tractor 104 and trailer 106 approach loading dock 432(3), to identify the position of fiducial markings within the images. Alignment module 260 then determines a position and/or orientation of tractor 104 relative to known (e.g., previously surveyed) positions of fiducial markings, based upon optical configuration and position and orientation of cameras 218 relative to tractor 104. Alignment module 260 thereby improves position and/or orientation accuracy of tractor 104, as compared to position and orientation determined by location unit 216 using inertial navigation systems and odometry that may suffer from drift, and from a GPS signal that may suffer from availability and canyon effect, etc.

In certain embodiments, native objects may be used in conjunction with, or alternatively to, the fiducial markings. Native objects may include environmental objects detectable by the alignment module 260, such as painted lane markers (stripes), dock seals, markings on the walls, signs, etc.). In certain embodiments, alignment module 260 processes images (e.g., image 219) captured by cameras 218(1) and 218(2) as tractor 104 and trailer 106 approach loading dock 432(3), to identify the position of these native objects within the images 219. In FIG. 6, the edge of the dock may be a dock seal. The alignment module 260 then determines a position and/or orientation of tractor 104 and trailer 106 by comparing edges of the trailer 106 relative to the known (e.g., previously surveyed) positions of native objects, and based upon optical configuration and position and orientation of cameras 218 relative to tractor 104. Alignment module 260 thereby improves position and/or orientation accuracy of tractor 104, as compared to position and orientation determined by location unit 216 using inertial navigation systems and odometry that may suffer from drift, and from a GPS signal that may suffer from availability and canyon effect, etc.

Conventionally, the location of the back end of trailer 106 is estimated based on trailer angle 233 and a current location and orientation of tractor 104. Advantageously, by determining the location of the back end of trailer 106 relative to loading dock 632, tractor 104 may more accurately position trailer 106 at loading dock 632.

Autonomous Path Variation to Distribute Weight and Wear

Figure 7:
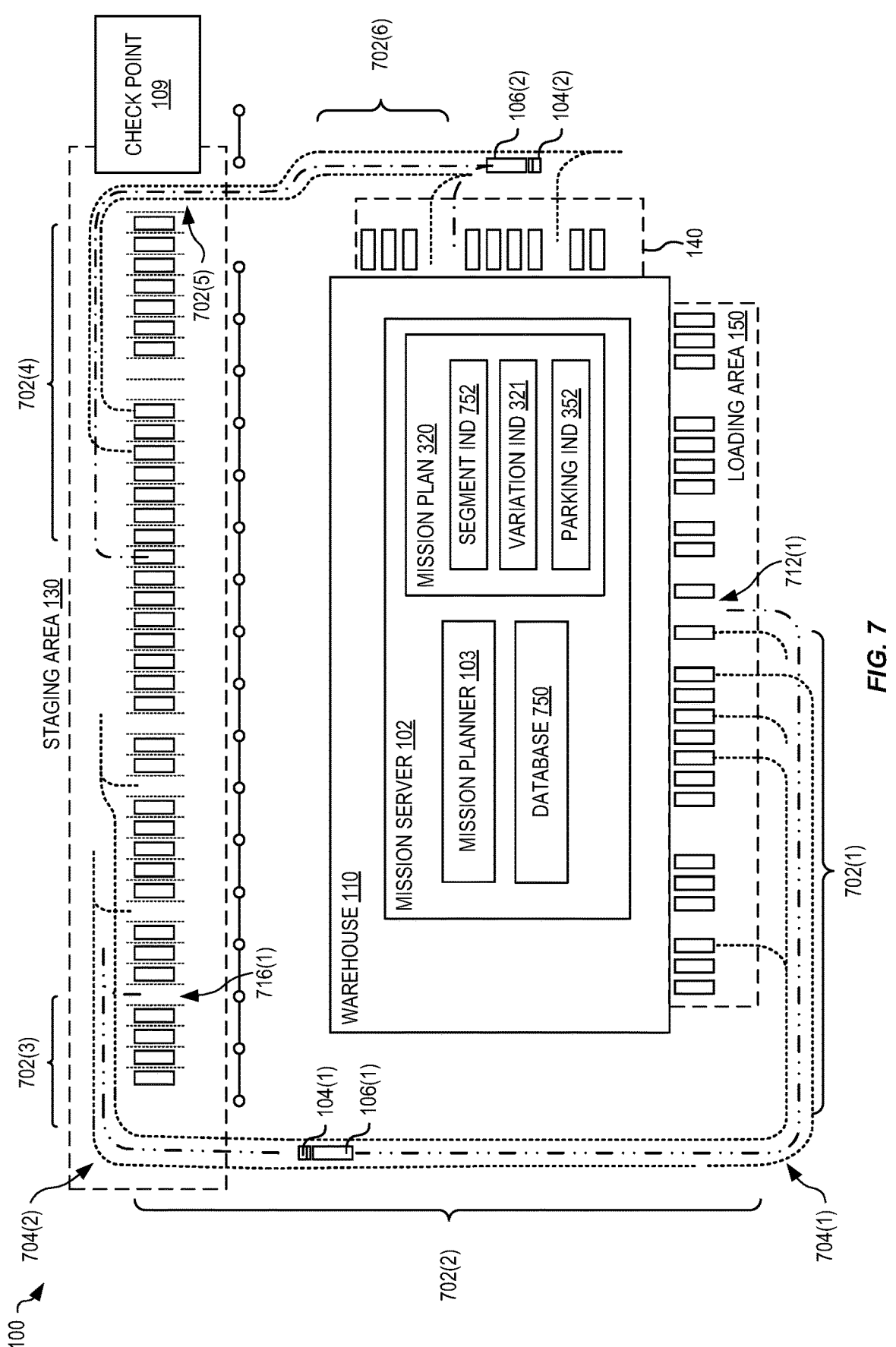
FIG. 7 shows autonomous path variation to distribute weight and wear within the autonomous yard of FIG. 1, in embodiments.

FIG. 7 shows autonomous path variation to distribute weight and wear within autonomous yard 100 of FIG. 1. As shown in FIG. 1, and described above, tractor 104 operates to follow defined paths, that through repetitive use, may deteriorate due to the weight of tractor 104 and trailers 106 being maneuvered. Mission plan 320, received from mission planner 103 running in mission server 102, defines one or more segments that are performed by maneuvering module 240 within tractor 104. In the example of FIG. 7, a first mission plan (e.g., mission plan 320) instructs tractor 104(1) to move trailer 106(1) from a starting spot 712(1) at loading area 150 to an ending spot 716(1) within staging area 130. Accordingly, mission plan 320 includes at least three path segments 702(1)-(3) and may include variation indicator 321 to indicate a variation from the standard path that tractor 104(1) should use. Each segment may have a corresponding set of predefined path variants, each defined by at least a starting geographic coordinate and an ending geographic coordinate for example, that path variator 312 may retrieve based on mission plan 320 and variation indicator 321.

Mission server 102 may include a database 750 that stores information of path segments 702 and usage information of path variants 802 and/or offsets. In certain embodiments, only path segments longer than a predefined path segment threshold (e.g., between one and two times the trailer length, 30 yards, etc.) have path variants.

Figure 8:
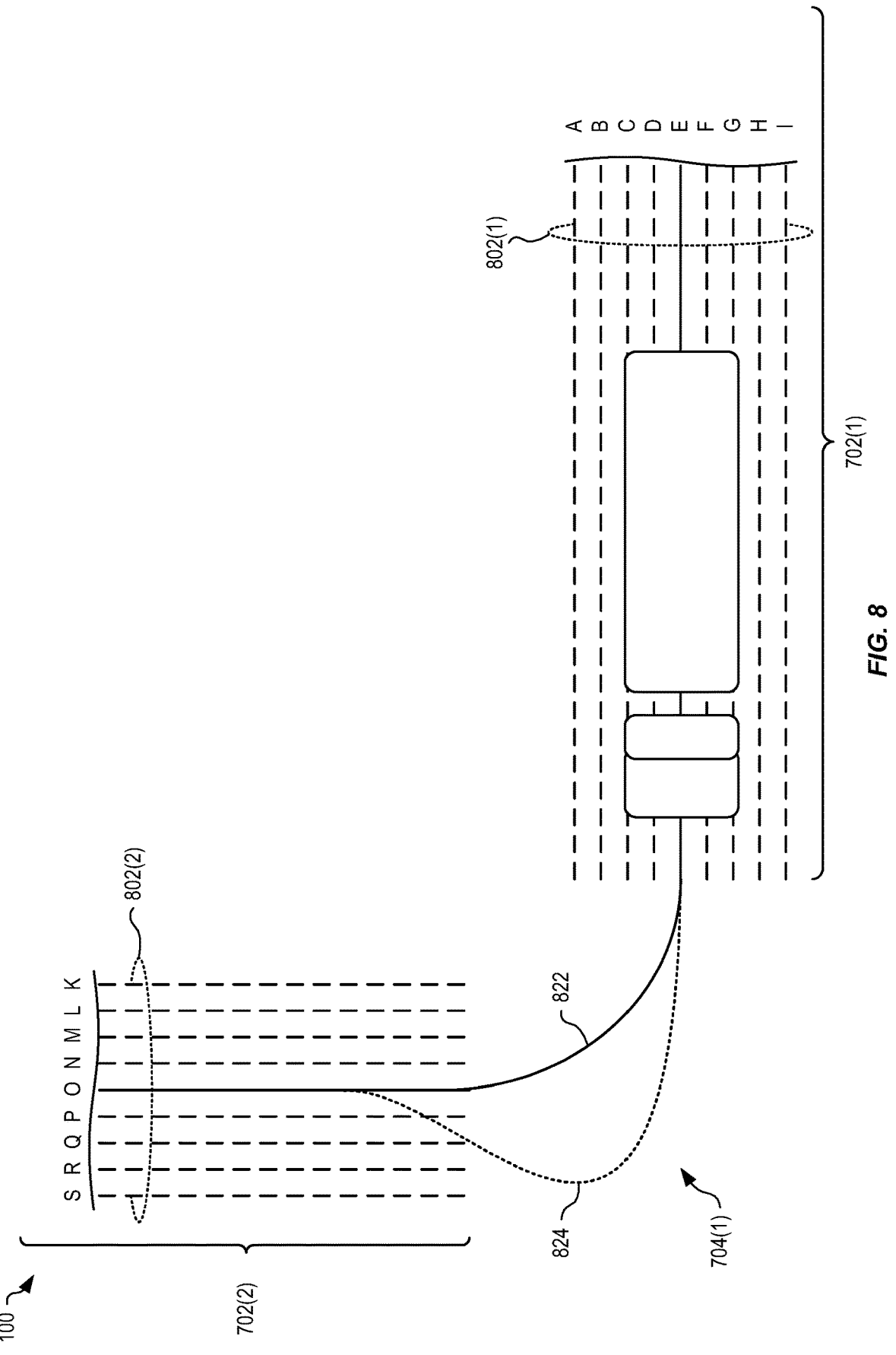
FIG. 8 shows a portion of the yard of FIG. 7 that includes part of the path segment formed of a plurality of predefined path variants, in embodiments.

FIG. 8 shows a portion of yard 100 that includes part of path segment 702(1) formed of a plurality of predefined path variants 802(1) and part of path segment 702(2) formed of a plurality of predefined path variants 802(2). For convenience of illustration, the plurality of predefined path variants 802(1) are labeled A-I, and the plurality of predefined path variants 802(2) are labeled K-S. Accordingly, variation indicator 321 may identify one of A-I for path segment 702(1), and variation indicator 321 may identify one of K-S for path segment 702(2). Other methods of indexing or defining each path variant may be used without departing from the scope hereof. In one example, variation indicator 321 defines an offset (e.g., one foot, eighteen inches, two feet, and so on, where the sign of the value indicates the direction of the offset) from a center path (e.g., from path E and path O for path segments 702(1) and 702(2), respectively). In embodiments, mission planner 103 may determine the offset based on the tire width of tractor 104 and/or trailer 106. Accordingly, path generator 310 generates the path variant based on the offset defined by variation indicator 321 and the center path. Variation indicator 321 may be constrained by the operational area available for the path segment. For example, variation indicator 321 does not identify a path variant, or defines an offset value, that positions tractor 104 and/or trailer 106 in a collision situation. For example, where a roadway or path has two-way traffic, mission planner 103 does not set variation indicator 321 that could potentially cause a collision between tractor 104 and/or trailer 106 and opposing traffic. Further, where the path segment is restricted, such as by structure within yard 100, mission planner 103 does not set variation indicator 321 to cause tractor 104 or trailer 106 to violate the constraint. For example, where path segment 702(5) is constrained by checkpoint 109 and other parked trailers, variation indicator 321 may have a smaller offset, to not select path variants that would cause tractor 104 or trailer 106 to collide with checkpoint 109 or other parked trailers. Although path segments 702 and path variants 802 are shown as being straight, path segments 702 and path variants 802 may be curved without departing from the scope hereof.

In certain embodiments, mission plan 320 defines the variation indicator 321 for each segment. Mission server 102 may include a database 750 that stores information of path segments 702 and usage information of path variants 802. For example, mission planner 103 may use database 750 to track one or both of usage count and/or weight carried for each path variant 802 of each path segment 702 within yard 100. Mission planner 103 may then determine a least used path variant 802 for each path segment 702 required by mission plan 320 and set variation indicator 321, for each path segment 702, to identify the least used path variant 802. In one example, mission planner 103 determines the least used path variant 802 based on a usage count for each path variant and selects the path variant that has been used the least. In another example, mission planner 103 determines the least used path variant 802 based on an estimated weight carried over each of the path variants and selecting the path variant that has carried the least weight. Advantageously, by using the least used path variant 802, the weight travelling over each path segment 702 is more evenly distributed and thereby wear to the surface of yard 100 for the path segment is reduced.

In certain embodiments, variation indicator 321 is not defined by mission server 102 but is instead determined by path variator 312. For example, path variator 312 may have a defined sequence (e.g., A, B, C, . . . I) of path variants 802 for each path segment 702, and iteratively step through the sequence with each traverse of path segment 702 by tractor 104. In other embodiments, mission planner 103 and/or path variator 312 randomly generates variation indicator 321 to vary the path used by tractor 104 and trailer 106. In situations where variation indicator 321 is randomly generated, any one of predefined path variants 802 may be randomly selected, or the offset itself may be randomly generated (e.g., predefined path variants 802 are not used, but instead a random offset is applied to a center path of path segment 702).

Maneuvering module 240 performs a turn 704(1) to transition from the end of the selected path variant 802 for path segment 702(1) to the start of the selected path variant 802 for path segment 702(2). In the example of FIG. 8, turn 704(1) transitions from an end of path E to a start of path O, such that trailer 106(1) (e.g., a rear bogie of trailer 106(1)) follows a curved path 822 when tractor 104(1) follows a curved path 824. In certain embodiments, turn 704(1) is generated by maneuvering module 240 based on selected path variation (e.g., E) of path segment 702(1) and selected path variation (e.g., 0) of path segment 702(2). In another embodiment, mission planner 103 generates curved path 824 such that trailer 106 follows curved path 822 when tractor 104 follows curved path 824.

Each path segment 702 may have a different variation indicator 321, whereby maneuvering module 240 (or mission planner 103) generates curved paths 822 and 824 such that tractor 104 and trailer 106 join the appropriate path variant 802 when transitioning between path segments 702. Advantageously, by varying the path variants A-I and K-S for each path segment 702, and the corresponding curved paths 822/824 of turns 704, the weight and wear associated with movement of tractor 104 and trailer 106 is spread across a wider area, thereby reducing their effect on yard 100.

Path variations may be predefined to use available space within yard 100 as needed to reduce weight and wear at certain areas. In the example of FIG. 7, more space is available around path segments 702(1)-(3) as compared to space around path segments 702(4)-(6). For example, path segment 702(5) passes through an area restricted by checkpoint 109, and therefore path variation is also restricted. In certain embodiments, path segment 702(5) has fewer path variants 802 as compared to path segment 702(2), where the path variants 802 are the same distance (offset) for both path segments. In other embodiments, path segment 702(5) has the same number of path variants 802 as path segment 702(2), but each path variant has a smaller offset.

In certain embodiments, tractor 104 generates a variation (e.g., a path offset) in at least one path segment defined by mission plan 320. In this embodiment, mission plan 320 defines path segments 702 without variation, but indicates (e.g., within mission plan 320 for each path segment) that tractor 104 may vary at least one path segment within a defined limit (e.g., a maximum usable offset). Accordingly, within controller 206 of tractor 104, path generator 310 generates a variation path segments 702 indicated as being variable, such that tractor 102 does not always follow the same path. For example, to move trailer 706 from loading dock 712(1) to parking spot 716(1), mission plan 320 may define the same path segments 702, but indicate, for at least one path segment 702, that tractor 104 may vary its path. Tractor 704 determines an offset (e.g., randomly and/or based on previously used offsets, and/or weight carried for each previously used offset) and applies the offset to vary at least one path segment accordingly.

Figure 9:
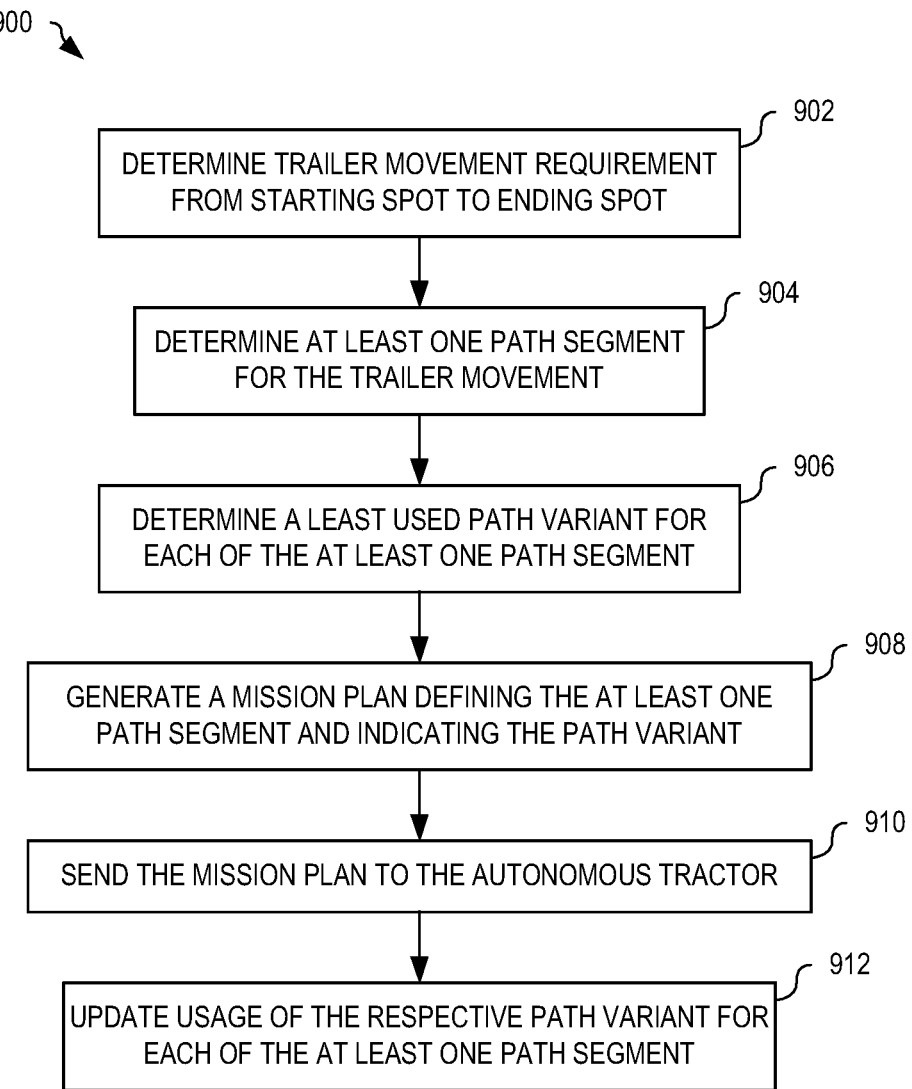
FIG. 9 is a flowchart illustrating one example method for autonomous path variation to distribute weight and wear, in embodiments.

FIG. 9 is a flowchart illustrating one example method 900 for autonomous path variation to distribute weight and wear. Method 900 is, for example, implemented in mission planner 103 of FIGS. 1 and 7.

In block 902, method 900 determines a trailer movement requirement from a starting spot to an ending spot. In one example of block 902, mission planner 103 receives a request to move trailer 106(1) from starting spot 712(1) to ending spot 716(1). In block 904, method 900 determines at least one path segment for the trailer movement. In one example of block 904, mission planner 103 determines path segments 702(1)-(3) for movement of trailer 106 from starting spot 712(1) to ending spot 716(1). In block 906, method 900 determines a least used path variant for each of the at least one path segment. In one example of block 906, mission planner 103 uses database 750 to determine that path variant E is the least used of path variants 802(1) for path segment 702(1), and that path variant O is the least used of path variants 802(2) for path segment 702(2). In block 908, method 900 generates a mission defining the at least one path segment and indicating the path variant. In one example of block 908, mission planner 103 generates mission plan 320 to include segment indicator 752 identifying path segment 702(1) with a respective variation indicator 321 identifying path variant E. In block 910, method 900 sends the mission plan to the autonomous tractor. In one example of block 910, mission planner 103 sends mission plan 320 to autonomous tractor 104(1). In block 912, method 900 updates usage of the respective path variant for each of the at least one path segment. In one example of block 912, mission planner 103 updates database 750 to reflect the use of path variant E corresponding to path segment 702(1).

In certain embodiments, tractor 104 may detect damage in a path variant. For example, as tractor 104 moves trailer 106 along path variant E of path segment 702(1), path variator 312 may detect an unexpected changes in data sensed by one or more sensors. For example, location unit 216 may detect one or more of accelerations and/or jerks as tractor 104 traverses the path variant. In another embodiment, path variator 312 detects unexpected changes in speed and/or change in power required to move trailer 106 as tractor 104 traverses a particular path variant. For example, one or more accelerometers within the IMU of location unit 216 may indicate roughness/flatness of a road surface as tractor 104 traverses the path variant, whereby path variator 312 may determine an increase in roughness an indication of wear to the road surface for the path variant. Certain vibrations, jerks, changes in speed, and/or power requirements may be caused by features of yard 100, would be expected, and therefore ignored by path variator 312. Unexpected changes in sensed data are thereby indicative of possible dame to the path variant, hereafter called a path anomaly. Where the path anomaly occurs at an unexpected location, or where the path anomaly occurs within one path variant and not others, path variator 312 may notify mission planner 103 of potential damage to the path variant. Accordingly, mission planner 103 may reduce the amount of traffic assigned to that path variant, may stop using that path variant, and/or may action repair of the path variant. In other embodiments, an operator may indicate a damaged path variant. Even when path variants are not used, path anomalies may be detected and reported to mission planner 103. Mission planner 103 may then notify a responsible party of the detected damage.

In certain embodiments, tractor 106 may determine a weight of trailer 106. For example, as described in patent application Ser. No. 17/848,152 titled "Motor Stall and trailer Lift," filed Jun. 23, 2022, tractor 104 may sense a weight of trailer 106 at fifth wheel 222 based on sensed pressure. In another example, mission planner 103 may determine a weight of trailer 106 based in customer inventory data, etc. Where trailer 106 is not loaded (e.g., where trailer 106 is empty), wear caused by trailer 106 is less and may not be significant. Accordingly, when trailer 106 is determined to be empty, mission planner 103 may not invoke path variation.

Reducing Wear and Damage in a Trailer Parking Spot

Figure 10:
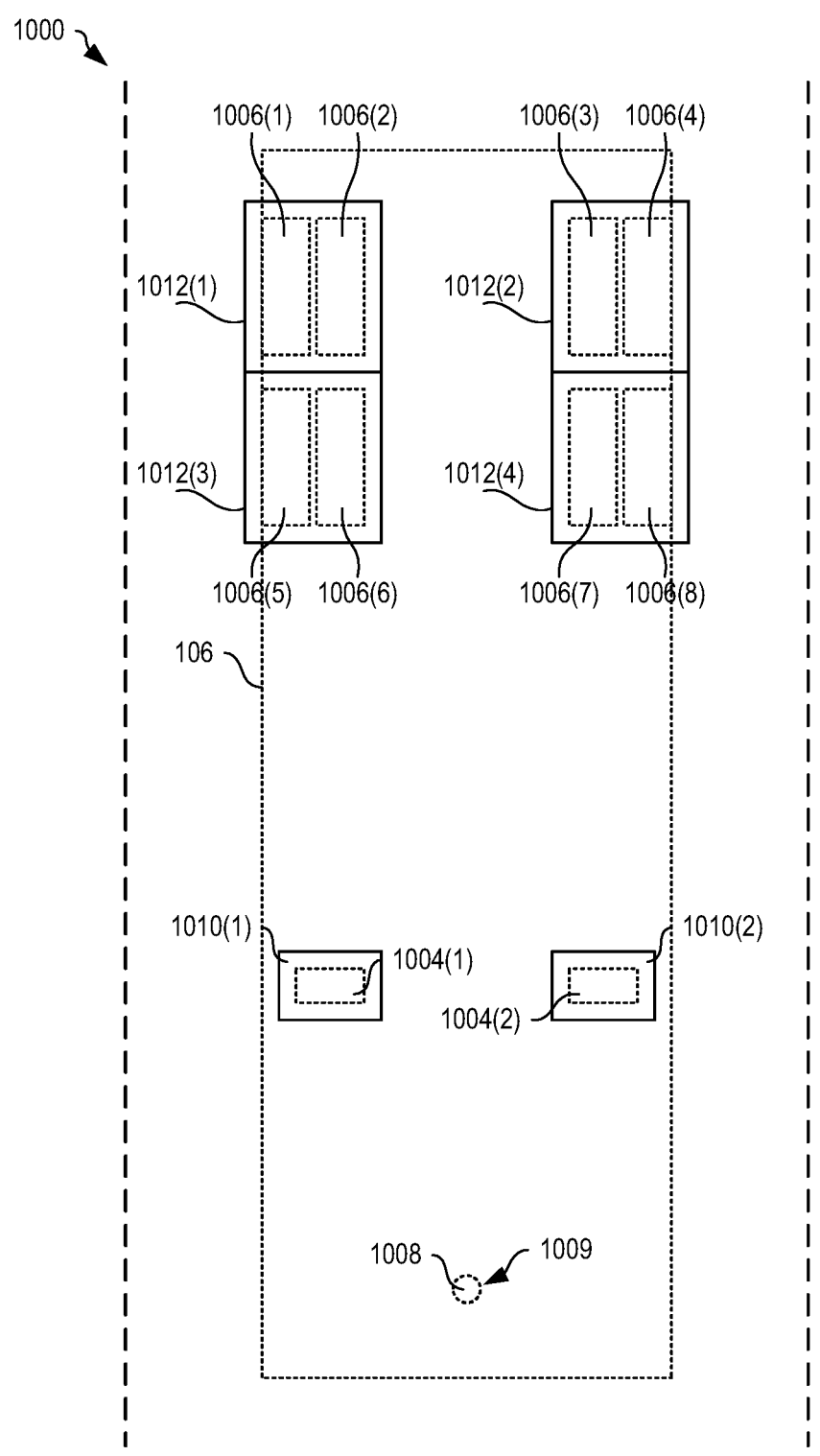
FIG. 10 is a plan view illustrating a trailer parked within a trailer parking spot of FIG. 1, in embodiments.

FIG. 10 is a plan view illustrating a trailer 106 parked within a trailer parking spot 1000 (e.g., any trailer parking spot in staging area 130, such as starting spot 112(2) and ending spot 114(1) of FIG. 1). Tractor 104, when parking trailer 106 in parking spot 1000 typically centers the trailer laterally within the parking spot, and with the front of the trailer at the front of the parking spot. One aspect of the present embodiments includes the realization that when trailers are parked by the autonomous tractor, since the tractor is more precise and consistent than a human driver, each trailer is parked in substantially the same position in the parking spot, causing wear and/or damage to certain areas of the parking spot over time. This damage is more likely to occur in the area of the trailer's landing gear, since a front portion of the trailer's weight is applied to the pads of the landing gear which have area smaller that the area of the tires at the rear of the trailer. For example, the weight of the front of the trailer may cause the landing gear pads to sink into a softer surface (e.g., tarmac in the summer), thereby causing permanent damage to the parking spot. The present embodiments solve this problem by varying the position of the trailer in the parking spot when parked by the autonomous tractor. Advantageously, by varying the position of the trailer, particularly the position of the landing gear, the weight and wear from the trailer are distributed over greater areas thereby reducing the significance of any damage to the parking spot.

In FIG. 10, trailer 106 is shown in dashed outline with a kingpin 1008, landing gear pads 1004(1) and 1004(2), and tires 1006(1)-(8). Each time trailer 106 is parked in parking spot 1000 in substantially the same position, landing gear pads 1004(1)-(2) repeated land within landing areas 1010(1)-(2), respectively, tires 1006(1)-(2) stop within tire area 1012(1), tires 1006(3)-(4) stop within tire area 1012(2), tires 1006(5)-(6) stop within tire area 1012(3), and tires 1006(7)-(8) stop within tire area 1012(4). Thus, weight of trailer 106 repeatedly depresses and or otherwise damages areas 1010 and 1012, whereas other areas of parking spot are less affected. Where the surface of parking spot 1000 is compressible and/or deformable, the resulting depressions of areas 1010 and 1012 may make maneuverability of trailer 106 within parking spot 1000 less consistent or predictable, thereby hindering movement of trailer 106.

Figure 11:
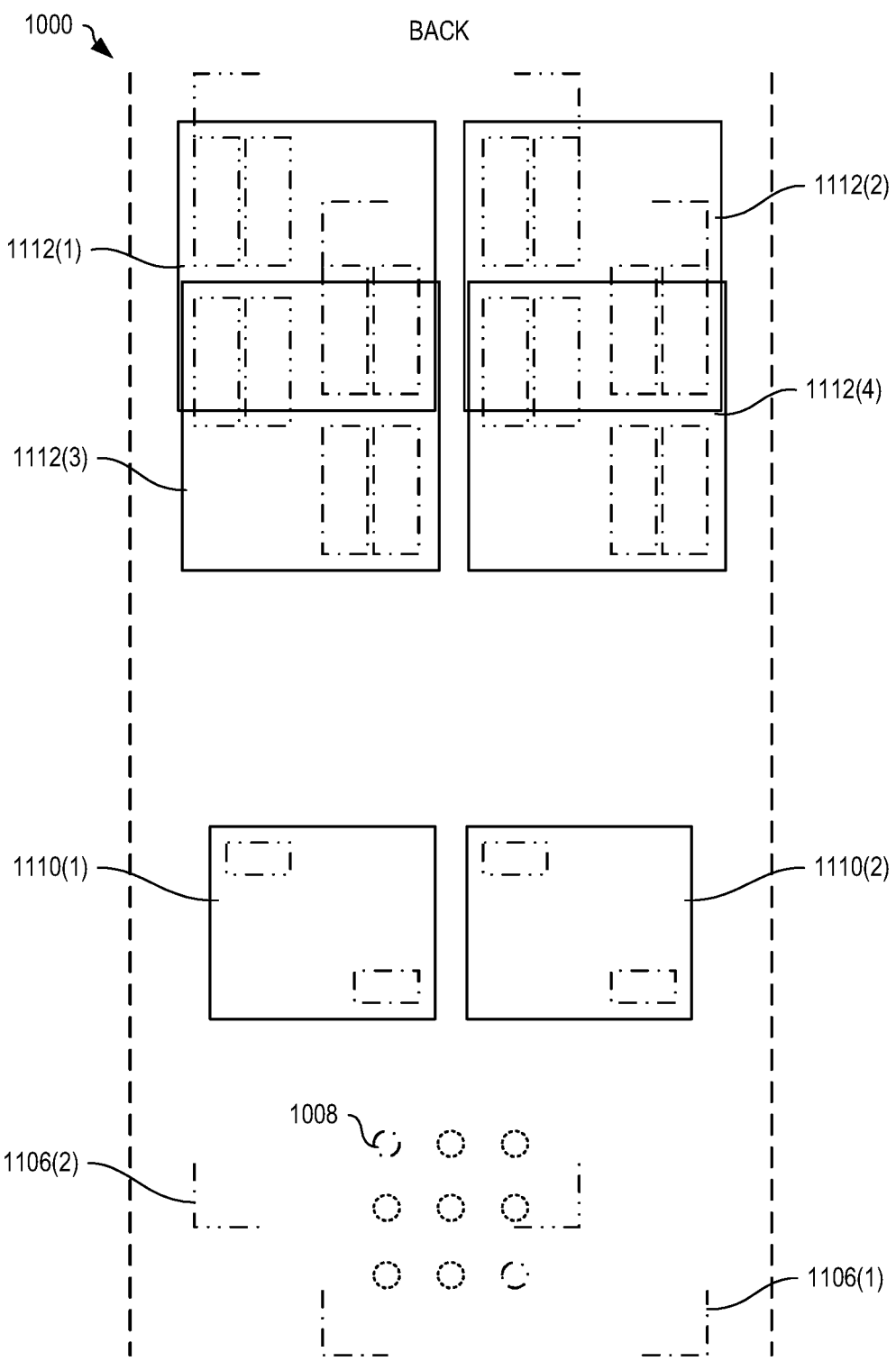
FIG. 11 is a plan view illustrating enlarged landing areas and enlarged tire areas resulting from varying the position used to park a trailer within the trailer parking spot of FIG. 10, in embodiments.

FIG. 11 is a plan view illustrating enlarged landing areas 1110(1)-(2) and enlarged tire areas 1112(1)-(4) resulting from varying the position used to park trailer 106 within trailer parking spot 1000 of FIG. 10. In this example, a trailer position 1106(1), indicated in a first dashed outline of trailer corners, tires, and landing pads, is at a front (longitudinal direction) right (lateral direction) side of parking spot 1000, and a trailer position 1106(2), indicated in a second dashed outline of trailer corners, tires, and landing pads, is at a back left side of parking spot 1000.

For clarity of illustration, only trailer positions 1106(1) and 1106(2) are shown; however, parking spot 1000 may have other designated trailer positions without departing from the scope hereof. Landing areas 1110(1)-(2) and tire areas 1112(1)-(4) are significantly larger than landing areas 1010(1)-(2) and tire areas 1012(1)-(4) of FIG. 10. Accordingly, trailer 106 may have many other positions within parking spot 1000 where its landing pads and tires stop within landing areas 1110(1)-(2) and tire areas 1112(1)-(4), respectively. Advantageously, by varying the position where trailer 106 is parked within parking spot 1000, wear and damage to parking spot 1000 is distributed over a greater area and thereby the effect of the trailer weight and wear is reduced within parking spot 1000.

In certain embodiments, parking spot 1000 is considered to have nine trailer parking positions, equally spaced, in a three-by-three array, as represented in FIG. 11 by positions of kingpin 1008. Since tractor 104 determines the positions of trailer 106 based upon the location and pose of tractor 104, an angle of trailer 106 relative to tractor 104, and a length of trailer 106, the position of kingpin 1008 may be used to illustrate the various trailer parking positions. Trailer 106 pivots at kingpin 1008 relative to tractor 104, and therefore tractor 104 positions kingpin 1008 in one of the nine indicated positions when parking trailer 106 in parking spot 1000. In an alternate embodiment, parking offset may define a distance and angle relative to a normal (e.g., when trailer 106 is centered in parking spot 1000) kingpin position 1009. For example, the parking offset may define an angle of 180-degrees and an offset of 1 foot, whereby trailer 106 is parked in-line and one foot deeper into parking spot 1000 relative to normal kingpin position 1009. In another example, the parking offset may define an angle of 90-degrees and an offset of 1 foot, whereby trailer 106 is parked at the same depth as normal kingpin position 1009 but is offset one foot to the right. Other methods for defining variation in the parking position within parking spot 1000 may be used without departing from the scope hereof.

In certain embodiments, mission planner 103 generates mission plan 320 with a parking indicator 352 identifying a parking position within parking spot 1000. In certain embodiments, mission planner 103 uses database 750 to track use of each parking position within each parking spot (e.g., of at least staging area 130) of yard 100. Mission planner 103 then defines parking indicator 352 to use the least used parking position within the respective parking spot. That is, mission planner 103 tracks the variation in parking positions for each parking space and instructs tractor 104 to positions trailer 106 within the least used parking position of the assigned parking spot. In certain embodiments, mission planner 103 may also use database 750 to track the weight of each trailer parked in each parking position of each parking spot. Accordingly, mission planner 103 may select the parking position that has received the least amount of weight for next use. Accordingly, mission planner 103 takes the weight of each trailer into account when determining wear to each parking spot and when selecting the least used parking spot. In other embodiments, one of mission planner 103 or tractor 104 determines the parking position randomly each time it is directed to park trailer 106 in parking spot 1000.

FIG. 11 shows variation in parking position of trailer having the same length. However, where trailer 106 is of a different length, such as when a 28-foot trailer is to be parked in parking spot 1000 that is long enough for a 53-foot trailer, additional longitudinal variation may be used. This additional variation for shorter trailers provides additional distribution of weight and wear within parking spot 1000 since landing gear pads 1004 may be positioned in areas unusable by landing pads of longer trailers.

Another aspect of the present embodiments includes the realization that for different trailers 106 (e.g., different brands, types, and lengths) the landing gear is not necessarily at the same position relative to kingpin 1008. Since landing gear pads 1004 have a greater weight per area ratio, landing gear pads 1004 tend to cause more damage and wear than tires. Thus, it is important to ensure that the position of landing gear pads 1004 varies within landing areas 1110. However, since the position of landing gear pads 1004 vary between trailers 106, parking variator 314 cannot position landing gear pads 1004 by positioning kingpin 308 with an assumed landing gear position to ensure variation. The present embodiments solve this problem by detecting the position of the landing gear on trailer 106 prior to, or during, hitching of tractor 104 to trailer 106. In one example of operation, while driving by trailer 106 prior to hitching, tractor 104 uses LIDAR devices 220 to capture point cloud 221 that includes the front end of trailer 106. Parking variator 314 processes point cloud 221 to detect the front of trailer 106 and a position of landing gear pads 1004 relative to the detected front of trailer 106. Then, after hitching with trailer 106, tractor 104 uses LIDAR devices 220 to capture point cloud 221 that includes the front end of trailer 106 and, based on a known positioned of FW 222 relative to LIDAR devices 220, parking variator 314 determines a position of landing gear pads 1004 relative to kingpin 308. Accordingly, tractor 104 may position kingpin 308 such that the position of landing gear pads 1004 within landing areas 1110 is varied irrespective of the variation in position of landing gear pads 1004 between trailers.

In certain embodiments, tractor 104 may detect when a position within parking spot 1000 is damaged by detecting when more power than is expected to initiate movement of trailer 106. For example, where tires 1006 are in a depression when trailer 106 is at trailer position 1106(2), additional force is required to move trailer 106 out of the depression. When this force is greater than a predefined threshold and/or is required for a period greater than a predefined threshold, parking variator 314 may determine that the parking position is damaged and notify mission planner 103 to update database 750 such that trailer position 1106(2) of parking spot 1000 is not used, or used less frequently, or actioned for repair. In alternative embodiments, other sensors of location unit 216 may be used to detect damage (also called parking anomalies) within parking spots 1000, 1200. In other embodiments, an operator may indicate damage to a parking position within a parking spot. When a parking anomaly is detected, or where the parking anomaly occurs within one parking variant and not others, parking variator 314 may notify mission planner 103 of potential damage to the parking variant. Accordingly, mission planner 103 may reduce or stop use of that parking variant, and/or may action repair of the parking spot. In other embodiments, an operator may indicate a damaged parking spot or parking variant. Even when parking variants are not used, parking anomalies may be detected and reported to mission planner 103. Mission planner 103 may then notify a responsible party of the detected damage.

Mission planner 103 may track the use of each parking position within each parking spot in database 750 and may track damage to each parking position within each parking spot as detected by tractor 104.

Figure 12:
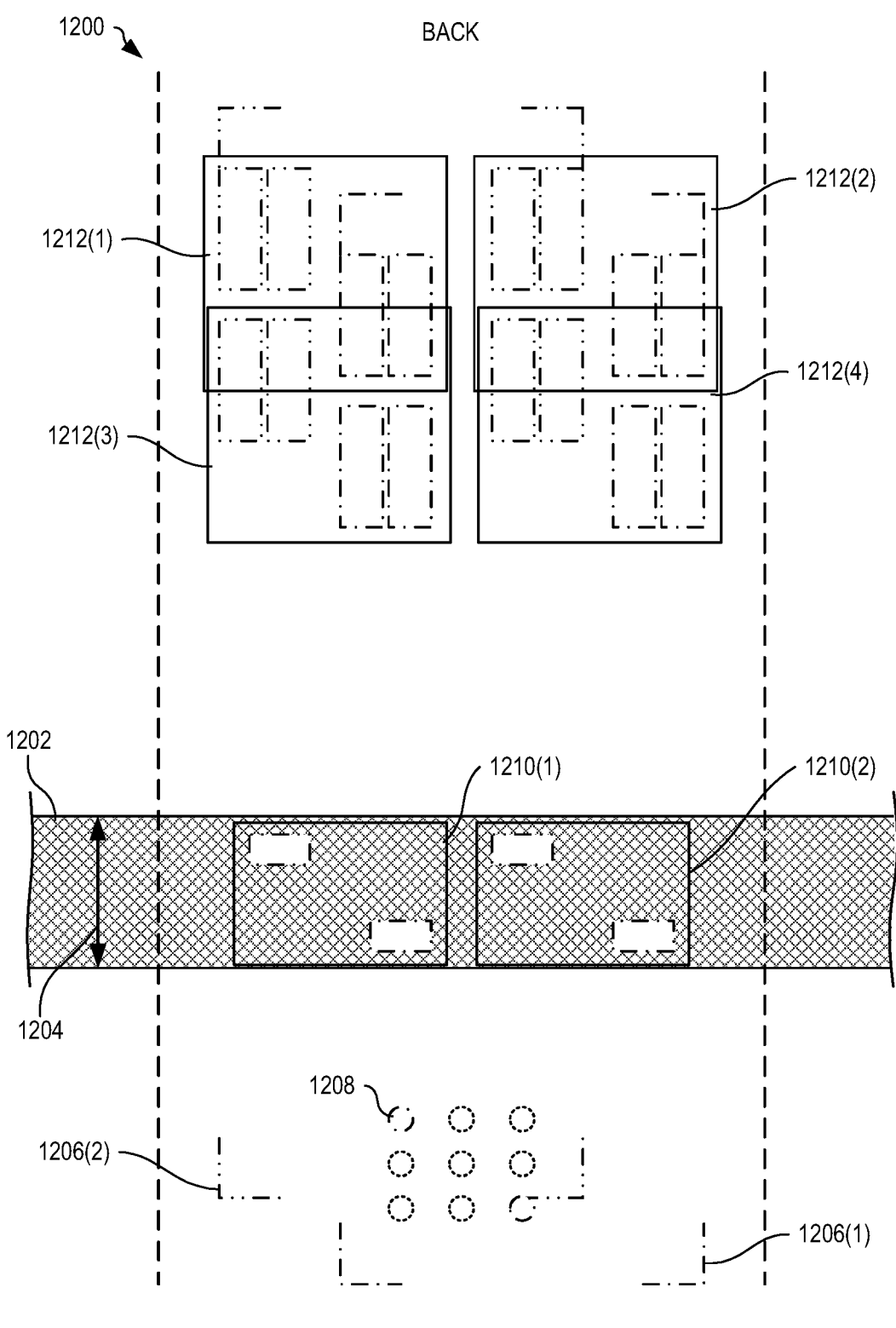
FIG. 12 is a plan view of a parking spot similar to the parking spot of FIG. 10 but further including a landing pad strip, in embodiments.

FIG. 12 is a plan view of a parking spot 1200 that is similar to parking spot 1000 of FIG. 10 but further includes a landing pad strip 1202 that may be formed of a more durable material (e.g., concrete) compared to material (e.g., asphalt) used for the rest of parking spot 1200. Landing gear strip 1202 thereby provides a more durable surface to support landing gear pads 1004. Landing areas 1210(1)-(2) and tire areas 1212(1)-(4) of FIG. 10 are smaller than landing areas 1110(1)-(2) and tire areas 1112(1)-(4) of FIG. 11 since it is desirable to keep landing gear pads 1004 on landing gear strip 1202 and depth 1204 of landing gear strip 1202 may reduce the available space. In this example, a trailer position 1206(1), indicated in a first dashed outline of trailer corners, tires, and landing pads, is at a front (longitudinal direction) right (lateral direction) side of parking spot 1200, and a trailer position 1206(2), indicated in a second dashed outline of trailer corners, tires, and landing pads, is at a back left side of parking spot 1200. In the example of FIG. 12, longitudinal spacing between trailer positions (as indicated by kingpin 1208 positions) is reduced to keep landing gear pads 1004 on landing gear strip 1202. In alternative embodiments, spacing between trailer positions within parking spot 1200 remain the same as those shown in FIG. 11, but positions where landing gear pads 1004 are not on landing gear strip 1202 are not used.

Figure 13:
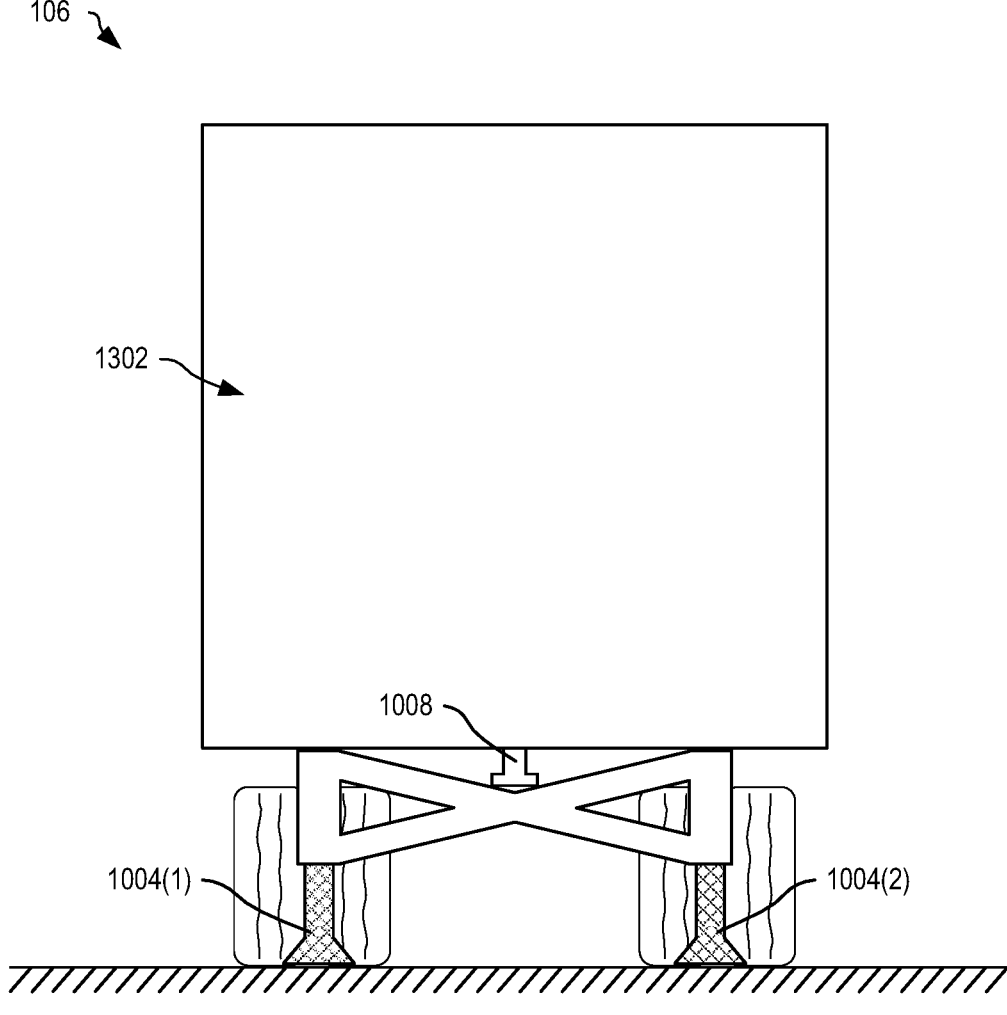
FIG. 13 is a front view of a trailer such as may be captured in image by at least one camera of the tractor, in embodiments.

FIG. 13 is a front view of trailer 106 such as may be captured in image 219 by at least one camera 218 of tractor 104. LIDAR device 220 may capture a corresponding point cloud 221 that include trailer 106. Parking variator 314 processes point cloud 221 to identify at least one of a front surface 1302 (e.g., a plane) of trailer 106 and kingpin 1008, and to identify landing gear pads 1004(1)-(2). Parking variator 314 may also use 3D processing of at least two images 219 (e.g., captured at different positions as tractor 104 drove by trailer 106) to detect positions of landing gear pads 1004 relative to one or both of front surface 1302 and kingpin 1008. In certain embodiments, such evaluation of point cloud 221 may be part of the hitching process implemented by maneuvering module 240.

Based on the determined position of landing gear pads 1004 relative to kingpin 1008, parking variator 314 may position trailer 106 within parking spot 1000 such that the positions of landing gear pads 1004 within landing areas 1110 are varied as compared to the position used by previous trailers parked in parking spot 1000.

In certain embodiments, tractor 106 may determine a weight of trailer 106. For example, as described in patent application Ser. No. 17/848,152 titled "Motor Stall and trailer Lift," filed Jun. 23, 2022, tractor 104 may sense a weight of trailer 106 at fifth wheel 222 based on sensed pressure. In another example, mission planner 103 may determine a weight of trailer 106 based in customer inventory data, etc. Where trailer 106 is not loaded (e.g., where trailer 106 is empty), wear caused by trailer 106 is less and may not be significant. Accordingly, when trailer 106 is determined to be empty, mission planner 103 and/or tractor 104 may not invoke parking variation.

Figure 14:
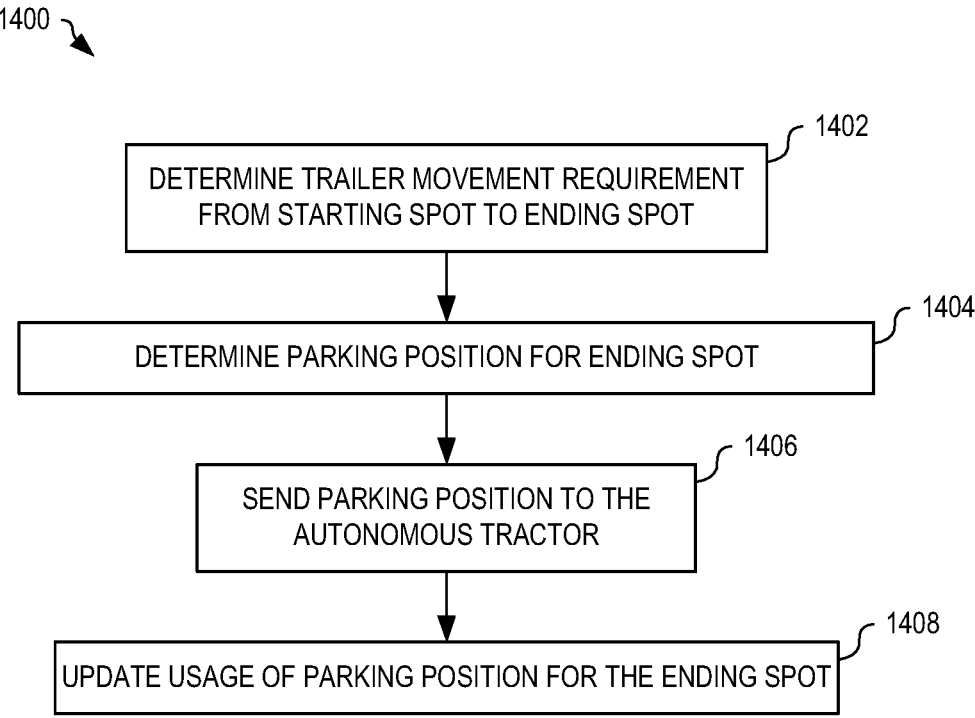
FIG. 14 is a flowchart illustrating one example method for parking variation of a trailer in a parking spot to distribute weight and wear, in embodiments.

FIG. 14 is a flowchart illustrating one example method 1400 for parking variation of a trailer in a parking spot to distribute weight and wear. Method 1400 is, for example, implemented within mission planner 103 of FIGS. 1 and 7.

In block 1402, method 1400 determines trailer movement requirement from starting spot to ending spot. In one example of block 1402, mission planner 103 receives a request to move trailer 106(1) from starting spot 712(1) to ending spot 716(1). In block 1404, method 1400 determines a parking position for the ending spot. In one example of block 1404, mission planner 103 retrieves parking position information for ending spot 716(1) from database 750 and determines the least used parking position. In another example of block 1404, mission planner 103 retrieves parking position information for ending spot 716(1) from database 750 and determines a parking position that has carried the least amount of trailer weight. In another example of block 1404, mission planner 103 determines a parking position at random.

In block 1406, method 1400 sends the parking position to the autonomous tractor. In one example of block 1406, mission planner 103 sends parking indicator 352 to indicate the selected parking position of ending spot 716(1). In block 1408, method 1400 updates usage of the parking position for the ending spot. In one example of block 1408, mission planner 103 updates database 750 to indicate the use of the parking position for ending spot 716(1). In another example of block 1408, mission planner 103 updates database 750 to add the weight of trailer 106 to the selected parking position for ending spot 716(1).

Staging Point Variation

As shown in FIG. 4, when reversing trailer 106 up to drop-off spot 470 (e.g., loading dock 432(3) in FIG. 4, or a parking spot within staging area 130), tractor 104 positions trailer 106 at staging point 472 prior to reversing trailer 106 along backing path 482. Where staging point 472 is used to reverse trailer 106 to drop-off spot 470, excessive wear may occur to the apron where trailer 106 is pivoted to align with reference path 476, centered on drop-off spot 470, since trailer 106 makes a tight turn around its rear wheels. Similar damage occurs where tractor 104 makes a sharp U turn with trailer 106 to reverse direction. To avoid wear and damage to the same area of the apron, staging point 472 (and other staging points) may also be varied such that the pivot of trailer 106 occurs at different locations.

Figure 15:
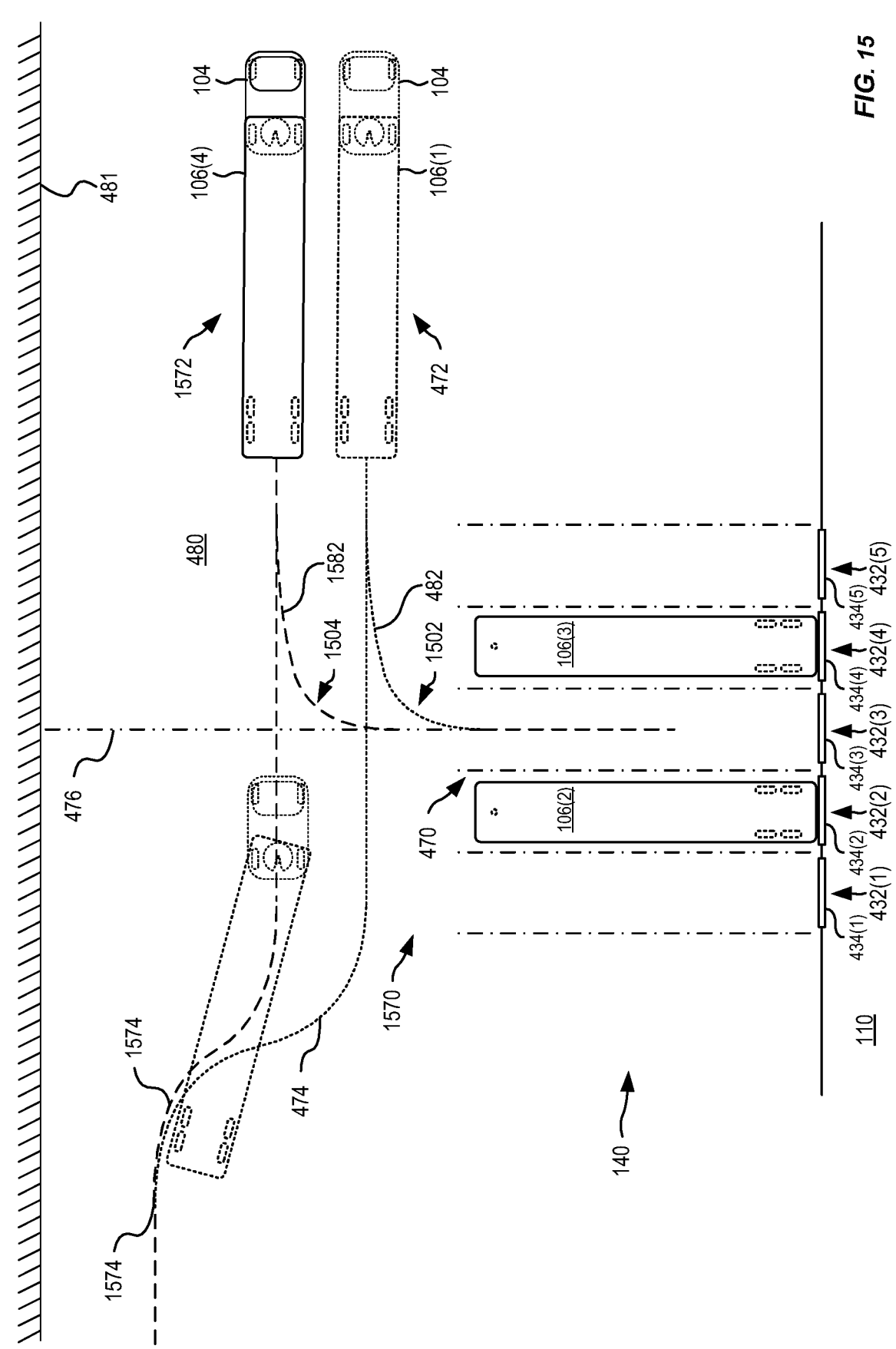
FIG. 15 is a schematic plan view illustrating a drop-off spot at a loading dock within an unloading area of the autonomous yard of FIG. 1, as shown in FIG. 4, with staging point variation to reduce wear, in embodiments.

FIG. 15 is a schematic plan view illustrating drop-off spot 470 at loading dock 432 within unloading area 140 of autonomous yard 100 of FIG. 1, as shown in FIG. 4, with staging point variation to reduce wear. From staging point 472, to maneuver trailer 106(1) into drop-off spot 470, tractor 104 performs a tight reverse turn to cause trailer 106(1) to follow backing path 482 that causes tires of trailer 106(1) to pivot around the turning point of trailer 106(1) at location 1502. Thus, at location 1502, the tight turn causes additional wear from tires of trailer 106(1) (as compared to when trailer 106(1) is not turning for example). This wear is compounded when that same staging point 472 is used for multiple trailers being maneuvered into drop-off spot 470.

To reduce wear at the same location (e.g., location 1502), one or both of mission planner 103 and maneuvering module 240 varies the staging point for drop-off spot 470. In the example of FIG. 15, tractor 104 positions trailer 106(1) at staging point 1572 by following staging path 1574, which is varied from staging path 474. From staging point 1572, tractor 104 reverses trailer 106(1) along a backing path 1882 to align with reference path 476. Backing path 1582 causes trailer 106(1) to pivot around the turning point of trailer 106(1) at location 1504, which is different from location 1502. Advantageously, by varying the staging point for drop-off spot 470, wear and damage to the surface of yard 100 by pivoting trailer 106(1) does not occur in the same place.

In the example of FIG. 15, backing path 1582 has the same turning radius as backing path 482. However, backing path 1582 may have a larger radius than backing path 482 since trailer 106(1) is required to make a less tight turn from staging point 1572, and therefore wear and damage may be further reduced.

In certain embodiments, mission plan 320 includes a staging indicator 354 that defines the variation for staging point 1572 from staging point 472. For example, staging point 472 may be considered a reference staging point, and staging indicator 354 defines an offset (e.g., a latitude/longitude offset, an angle and distance offset, etc.) for staging point 1572 from reference staging point 472. Within mission executor 304 of tractor 104, a staging variator 316 uses staging indicator 354 to determine staging point 1572 from reference staging point 472. Where reference staging point 472 is the closest possible staging point to drop-off spot 470, staging point variations (e.g., staging point variation 1572) are further away from drop-off spot 470. A furthest staging point variation may be determined based on available space (e.g., freespace 480), from where tractor 104 still has enough room to maneuver trailer 106(1) into drop-off spot 470 without leaving freespace 480.

In certain embodiments, mission planner 103 generates staging indicator 354 to select the least frequently used staging point based on tracked frequency of use data in a database. In other embodiments, mission planner 103 generates staging indicator 354 to select the staging point that has carried the least amount of trailer weight, tracking weight of trailers that use the staging point in a database. In other embodiments, mission planner 103 generates staging indicator 354 at random.

In certain embodiments, staging indicator 354 indicates only that variation in the staging point is permitted, whereby staging variator 316 randomly selects a variation of the staging point. In other embodiments, staging variator 316 tracks its use of each staging point variation and selects the least frequency used staging point variation. In other embodiments, staging variator 316 tracks weight of trailers it has dropped into drop-off spot 470 for each staging point variation and selects the staging point variation having carried the least amount of weight.

In certain embodiments, when trailer 106(1) is empty or below a certain weight, staging point variation is not initiated since damage from an empty trailer is minimal compared to damage by a heavily loaded trailer.

Figure 16:
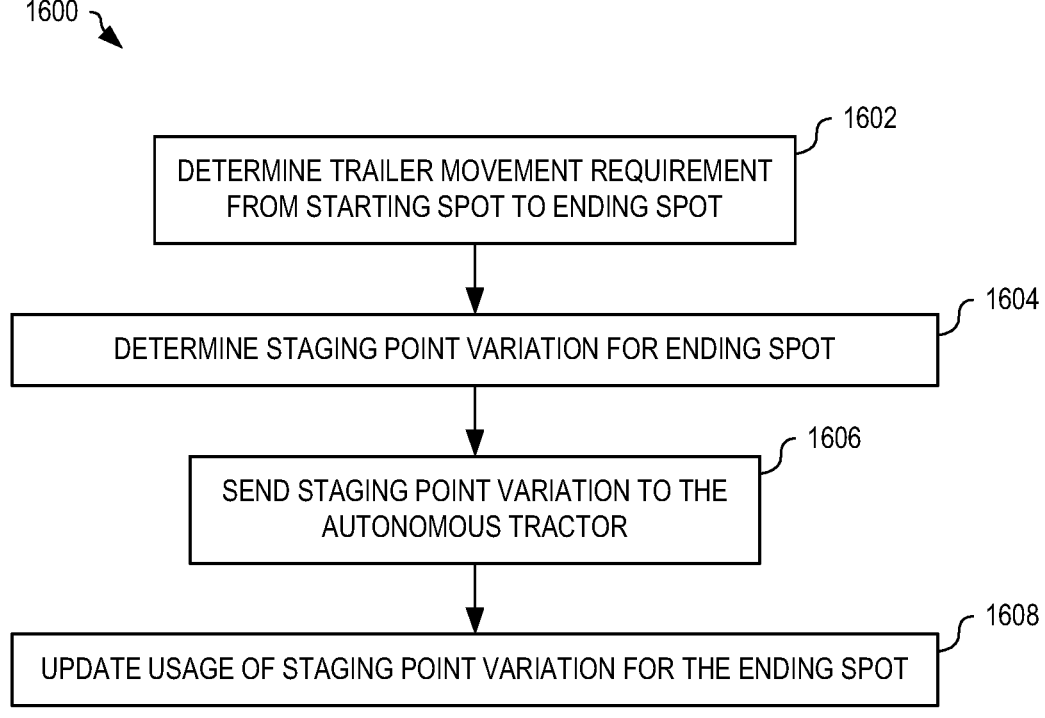
FIG. 16 is a flowchart illustrating one example method for staging point variation to distribute weight and wear caused during tight turns of trailer, in embodiments.

FIG. 16 is a flowchart illustrating one example method 1600 for staging point variation to distribute weight and wear caused during tight turns of trailer 106. Method 1600 is, for example, implemented within mission planner 103 of FIGS. 1 and 7.

In block 1602, method 1600 determines trailer movement requirement from starting spot to ending spot. In one example of block 1602, mission planner 103 receives a request to move trailer 106(1) from starting spot 712(1) to ending spot 716(1). In block 1604, method 1600 determines a staging point variation for the ending spot. In one example of block 1604, mission planner 103 retrieves staging point information for ending spot 716(1) from database 750 and determines a least used one of a plurality of staging point variations. In another example of block 1604, mission planner 103 retrieves staging point information for ending spot 716(1) from database 750 and determines a staging point variation that has carried the least amount of trailer weight. In another example of block 1604, mission planner 103 determines a staging point variation at random.

In block 1606, method 1600 sends the staging point variation to the autonomous tractor. In one example of block 1606, mission planner 103 sends staging indicator 354 to indicate the selected staging point variation for ending spot 716(1). In block 1608, method 1600 updates usage of the staging point variation for the ending spot. In one example of block 1608, mission planner 103 updates database 750 to indicate the use of the staging point variation for ending spot 716(1). In another example of block 1608, mission planner 103 updates database 750 to add a weight of trailer 106 to the selected staging point variation.

It should be appreciated that any one or more of the functionalities of maneuvering module 240 may be implemented in combination with one another. For example, path generator 310 may be implemented alone or in combination with any one or more of path variator 312, parking variator 314, and staging variator 316. Similarly, path variator 312 may be implemented alone or in combination with any one or more of path generator 310, parking variator 314, and staging variator 316. Similarly, parking variator 314 may be implemented alone or in combination with any one or more of path generator 310, path variator 312, and staging variator 316. Similarly, staging variator 316 may be implemented alone or in combination with any one or more of path generator 310, path variator 312, and parking variator 314.

Combination of Features:

The following embodiments are specifically contemplated based on the disclosure hereof, as well as any combinations of such embodiments and inclusion of other features disclosed above but not specifically referenced below that are compatible with one another:

(A1) In an embodiment of a first aspect, a system for path variation of an autonomous tractor within a yard, comprises: a processor; a memory storing a maneuvering module as computer readable instructions that, when executed by the processor, operate to instruct maneuvering of the autonomous yard vehicle by: determining a path for the autonomous tractor to move a trailer from a start spot to an ending spot; one or more of: determining a variation indicator for the path segment, the variation indicator indicating a path variant for the autonomous tractor to follow for the path segment, when the ending spot is a parking spot, determining a parking indicator defining a parking variation in parking position in the parking spot, and when the ending spot is a parking spot, determining a staging indicator defining one of a plurality of staging point variations for the parking spot; and creating a mission plan for maneuvering the autonomous trailer including one or more of (i) the path segment and the variation indicator, (ii) the parking indicator, and (iii) the staging indicator.

(A2) In embodiment (A1), the processor and memory are local to the autonomous tractor.

(A3) In embodiment (A1), the processor and memory are located external from the autonomous tractor.

(A4) In any embodiment (A1)-(A3), the path segment having a length greater than a path segment threshold.

(A5) In any embodiment (A1)-(A4), the variation indicator identifying one of a plurality of path variants for the path segment.

(A6) In any embodiment (A1)-(A5), each of the plurality of path variants being parallel to, and offset from, each other.

(A7) In any embodiment (A1)-(A6), the determining the variation indicator comprising selecting a least frequently used one of the plurality of path variants.

(A8) In any embodiment (A1)-(A7), the determining the variation indicator comprising indicating one of the plurality of path variants at random.

(A9) In any embodiment (A1)-(A8), the determining the variation indicator comprising selecting one of the plurality of path variants that has carried a least amount of trailer weight.

(A10) In any embodiment (A1)-(A9), the maneuvering module further operating to instruct the maneuvering by further defining the plurality of path variants based on an operating width of the path segment.

(A11) In any embodiment (A1)-(A10), the maneuvering module further operating to instruct the maneuvering by further defining the plurality of path variants based on one or more of a size and maneuverability of the autonomous tractor, and a size of the trailer.

(A12) In any embodiment (A1)-(A11), the variation indicator comprising an identifier of one of the plurality of path variants.

(A13) In any embodiment (A1)-(A12), the variation indicator comprising an offset defining a distance between the path variant and the path of the path segment.

(A14) In any embodiment (A1)-(A13), the maneuvering module further operating to instruct the maneuvering by further detecting damage to the path variant and avoiding use of the path variant while damaged.

(A15) In any embodiment (A1)-(A14), the parking indicator identifying one of a plurality of predefined parking positions within the parking spot.

(A16) In any embodiment (A1)-(A15), one or both of: the determining the parking indicator comprising selecting one of the plurality of predefined parking positions within the parking spot that has been used least frequently, and the determining the staging indicator comprising identifying one of the plurality of staging point variations that has been used least frequently.

(A17) In any embodiment (A1)-(A16), one or both of: the determining the parking indicator comprising selecting one of the plurality of predefined parking positions that has carried a least amount of trailer weight, and the determining the staging indicator comprising identifying one of the plurality of staging point variations that has carried a least amount of trailer weight.

(A18) In any embodiment (A1)-(A17), one or both of: the determining the parking indicator comprising randomly selecting the one of the plurality of predefined parking positions, and the determining the staging indicator comprising randomly selecting one of the plurality of staging point variations.

(A19) In any embodiment (A1)-(A18), one or both of: the parking indicator defining a parking offset relative to a centered parking position of the parking spot, and the staging indicator defining a staging offset relative to a reference staging point of the parking spot.

(A20) In any embodiment (A1)-(A4), one or both of: the parking offset having an angle and a distance relative to the centered parking position of the parking spot, and the staging offset having an angle and a distance relative to the reference staging point of the parking spot.

(A21) In any embodiment (A1)-(A20), the maneuvering module further operating to select a least frequently used one of a plurality of predefined parking positions within the parking spot and determining the angle and the offset from the centered parking position to the least frequently used one of the plurality of parking positions.

(A22) In any embodiment (A1)-(A21), the maneuvering module further operating to select one of a plurality of predefined parking positions within the parking spot that has carried the least amount of trailer weight and determining the angle and the offset from the centered parking position to the selected one of the plurality of parking positions.

(A23) In any embodiment (A1)-(A22), the maneuvering module further operating to one or more of: track use of the path variant, track use of the variation in parking position for the parking spot, and track use of the staging point variation for the parking spot.

(A24) In any embodiment (A1)-(A23), further comprising one or both of tracking weight of the trailer for the variation in parking position, and tracking weight of the trailer for the staging point variation.

(A25) In any embodiment (A1)-(A24), further comprising detecting damage to the parking position within the parking spot and avoiding use of the parking position while damaged.

(B1) In an embodiment of a second aspect, a method for path variation of an autonomous tractor within a yard, comprises: determining a path for the autonomous tractor to move a trailer from a start spot to an ending spot, the path having a path segment; determining a variation indicator for the path segment, the variation indicator indicating a path variant for the autonomous tractor to follow for the path segment; and creating a mission plan including an indication of the path segment and the variation indicator for the autonomous tractor.

(B2) In embodiment (B1), the path segment having a length greater than a path segment threshold.

(B3) In either embodiment (B1) or (B2), the variation indicator identifying one of a plurality of path variants for the path segment.

(B4) In any embodiment (B1)-(B3), each of the plurality of path variants being parallel to, and offset from, each other.

(B5) In any embodiment (B1)-(B4), the determining the variation indicator comprising selecting a least frequently used one of the plurality of path variants.

(B6) In any embodiment (B1)-(B5), the determining the variation indicator comprising indicating one of the plurality of path variants at random.

(B7) In any embodiment (B1)-(B6), the determining the variation indicator comprising indicating one of the plurality of path variants that has carried a least amount of trailer weight.

(B8) In any embodiment (B1)-(B7), further comprising defining the plurality of path variants based on an operating width of the path segment.

(B9) In any embodiment (B1)-(B8), further comprising defining the plurality of path variants based on one or more of a size and maneuverability of the autonomous tractor, and a size of the trailer.

(B10) In any embodiment (B1)-(B11), the variation indicator comprising an identifier of one of the plurality of path variants.

(B11) In any embodiment (B1)-(B10), the variation indicator comprising an offset defining a distance between the path variant and the path of the path segment.

(B12) In any embodiment (B1)-(B11), further comprising tracking use of the path variant in a database.

(B13) In any embodiment (B1)-(B12), further comprising detecting damage to the path variant and avoiding use of the path variant while damaged.

(C1) In an embodiment of a third aspect, a method for reducing wear to a trailer parking spot in a yard, comprises: determining a parking spot for an autonomous tractor to park a trailer; determining a parking indicator defining a variation in parking position in the parking spot; causing the autonomous tractor to park the trailer in the parking spot based on the parking indicator.

(C2) In embodiment (C1), the parking indicator identifying one of a plurality of predefined parking positions within the parking spot.

(C3) In either embodiment (C1) or (C2), the determining the parking indicator comprising selecting one of the plurality of predefined parking positions within the parking spot that has been used least frequently.

(C4) In any embodiment (C1)-(C3), the determining the parking indicator comprising selecting one of the plurality of predefined parking positions that has carried a least amount of trailer weight.

(C5) In any embodiment (C1)-(C4), the determining the parking indicator comprising randomly selecting the one of the plurality of predefined parking positions.

(C6) In any embodiment (C1)-(C5), the parking indicator defining an offset relative to a centered parking position of the parking spot.

(C7) In any embodiment (C1)-(C6), the offset having an angle and a distance relative to the centered parking position of the parking spot.

(C8) In any embodiment (C1)-(C7), further comprising selecting a least frequently used one of a plurality of predefined parking positions within the parking spot and determining the angle and the offset from the centered parking position to the least frequently used one of the plurality of parking positions.

(C9) In any embodiment (C1)-(C8), further comprising selecting one of a plurality of predefined parking positions within the parking spot that has carried the least amount of trailer weight and determining the angle and the offset from the centered parking position to the selected one of the plurality of parking positions.

(C10) In any embodiment (C1)-(C9), further comprising tracking use of the variation in parking position for the parking spot in a database.

(C11) In any embodiment (C1)-(C10), further comprising tracking weight of the trailer for the variation in parking position in the database.

(C12) In any embodiment (C1)-(C11), further comprising detecting damage to the parking position within the parking spot and avoiding use of the parking position while damaged.

(D1) In an embodiment of a fourth aspect, a method for staging point variation of an autonomous tractor to distribute weight and wear within a yard, comprises: determining a parking spot for an autonomous tractor to park a trailer; determining a staging indicator defining one of a plurality of staging point variations for the parking spot; and creating a mission plan including the staging indicator for the autonomous tractor.

(D2) In embodiment (D1), the determining the staging indicator comprising identifying one of the plurality of staging point variations that has been used least frequently.

(D3) In either embodiment (D1) or (D2), the determining the staging indicator comprising identifying one of the plurality of staging point variations that has carried a least amount of trailer weight.

(D4) In any embodiment (D1)-(D3), the determining the staging indicator comprising randomly selecting one of the plurality of staging point variations.

(D5) In any embodiment (D1)-(D4), the staging indicator defining an offset relative to a reference staging point of the parking spot.

(D6) In any embodiment (D1)-(D5), the offset having an angle and a distance relative to the reference staging point of the parking spot.

(D7) In any embodiment (D1)-(D6), further comprising tracking use of the staging point variation for the parking spot in a database.

(D8) In any embodiment (D1)-(D7), further comprising tracking weight of the trailer for the staging point variation in the database.

Any embodiment of any aspect described above may be combined together, including embodiments from different disclosed aspects, as well as including any additional feature described in the detailed description above.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A system for path variation of an autonomous tractor within a yard, comprising:
a processor;
a memory storing computer readable instructions that, when executed by the processor, operate to instruct maneuvering of the autonomous tractor by:
determining a path with at least one path segment for the autonomous tractor to move a trailer from a start spot to an ending spot;
one or more of:
determining a variation indicator for the path segment, the variation indicator indicating one of a plurality of predefined path variants of the path segment,
when the ending spot is a parking spot, determining a parking indicator defining a parking variation in parking position in the parking spot, and
when the ending spot is a parking spot, determining a staging indicator defining one of a plurality of staging point variations for the parking spot; and
creating an updated path for maneuvering the autonomous trailer based on one or more of (i) the path segment and the variation indicator, (ii) the parking indicator, and (iii) the staging indicator.

2. The system of claim 1, wherein the processor and the memory are local to the autonomous tractor.

3. The system of claim 1, wherein the processor and the memory are located external from the autonomous tractor.

4. The system of claim 1, each of the plurality of predefined path variants being parallel to, and offset from, each other.

5. The system of claim 1, the determining the variation indicator comprising selecting a least frequently used one of the plurality of predefined path variants.

6. The system of claim 1, the determining the variation indicator comprising indicating one of the plurality of predefined path variants at random.

7. The system of claim 1, the determining the variation indicator comprising selecting one of the plurality of predefined path variants that has carried a least amount of trailer weight.

8. The system of claim 1, the memory further storing computer readable instructions that operate to instruct the maneuvering by further defining the plurality of predefined path variants based on an operating width of the path segment.

9. The system of claim 8, the memory further storing computer readable instructions that operate to instruct the maneuvering by further defining the plurality of predefined path variants based on one or more of a size and maneuverability of the autonomous tractor, and a size of the trailer.

10. The system of claim 1, the variation indicator comprising an offset defining a distance between the one of the plurality of predefined path variants and a center of the path segment, the autonomous tractor applying the offset when executing the maneuver.

11. The system of claim 1, the autonomous tractor including at least one sensor for detecting damage to the path variant and avoiding use of the path variant while damaged.

12. The system of claim 1, the parking indicator identifying one of a plurality of predefined parking positions within the parking spot.

13. The system of claim 12, one or both of:

the determining the parking indicator comprising selecting one of the plurality of predefined parking positions within the parking spot that has been used least frequently, and the determining the staging indicator comprising identifying one of the plurality of staging point variations that has been used least frequently.

14. The system of claim 12, one or both of:

the determining the parking indicator comprising selecting one of the plurality of predefined parking positions that has carried a least amount of trailer weight, and the determining the staging indicator comprising identifying one of the plurality of staging point variations that has carried a least amount of trailer weight.

15. The system of claim 12, one or both of:

the determining the parking indicator comprising randomly selecting the one of the plurality of predefined parking positions, and the determining the staging indicator comprising randomly selecting one of the plurality of staging point variations.

16. The system of claim 1, one or both of:

the parking indicator defining a parking offset relative to a centered parking position of the parking spot, and the staging indicator defining a staging offset relative to a reference staging point of the parking spot.

17. The system of claim 16, one or both of:

the parking offset having an angle and a distance relative to the centered parking position of the parking spot, and the staging offset having an angle and a distance relative to the reference staging point of the parking spot.

18. The system of claim 16 the memory further storing computer readable instructions that operate to select a least frequently used one of a plurality of predefined parking positions within the parking spot and determining an angle and an offset from the centered parking position to the least frequently used one of the plurality of parking positions.

19. The system of claim 16, the memory further storing computer readable instructions that operate to select one of a plurality of predefined parking positions within the parking spot that has carried a least amount of trailer weight and determining an angle and an offset from the centered parking position to the selected one of the plurality of parking positions.

20. The system of claim 1, the memory further storing computer readable instructions that operate to one or more of:

track use of the path variant, track use of the variation in parking position for the parking spot, and track use of the staging point variation for the parking spot.

21. The system of claim 20, further comprising one or both of tracking weight of the trailer for the variation in parking position, and tracking weight of the trailer for the staging point variation.

22. The system of claim 1, the autonomous tractor including at least one sensor for detecting damage to the parking position within the parking spot and avoiding use of the parking position while damaged.

23. A method for path variation of an autonomous tractor within a yard, comprising:

determining a path for the autonomous tractor to move a trailer from a start spot to an ending spot, the path having a path segment;

determining a variation indicator for the path segment, the variation indicator indicating one of a plurality of predefined path variants for the autonomous tractor to follow for the path segment; and creating an updated path for the path segment based on one of the plurality of predefined path variants identified by the variation indicator for the autonomous tractor.

24. A method for reducing wear to a trailer parking spot in a yard, comprising:

determining a parking spot for an autonomous tractor to park a trailer;

determining a parking indicator defining a variation in parking position in the parking spot, the variation indicating one of a plurality of predefined parking positions for the trailer in the parking spot;

causing the autonomous tractor to park the trailer in the parking spot based on the parking indicator.

*  *  *  *  *